United States Patent
Guillou et al.

(10) Patent No.: US 7,080,254 B1
(45) Date of Patent: Jul. 18, 2006

(54) METHOD, SYSTEM, DEVICE FOR PROVING AUTHENTICITY OF AN ENTITY OR INTEGRITY OF A MESSAGE

(75) Inventors: Louis Guillou, Bourgbarre (FR); Jean-Jacques Quisquater, Rhode Saint Genese (BE)

(73) Assignee: France Telecom, Paris (FR)

( * ) Notice: Subject to any disclaimer, the term of this patent is extended or adjusted under 35 U.S.C. 154(b) by 547 days.

(21) Appl. No.: 10/089,662

(22) PCT Filed: Sep. 29, 2000

(86) PCT No.: PCT/FR00/02717

§ 371 (c)(1),
(2), (4) Date: Feb. 18, 2003

(87) PCT Pub. No.: WO01/26279

PCT Pub. Date: Apr. 12, 2001

(30) Foreign Application Priority Data

| Oct. 1, 1999 | (FR) | 99 12465 |
| Oct. 1, 1999 | (FR) | 99 12467 |
| Oct. 1, 1999 | (FR) | 99 12468 |
| Jul. 21, 2000 | (FR) | 00 09644 |

(51) Int. Cl.
*H04L 9/30* (2006.01)

(52) U.S. Cl. .................... 713/181; 380/30

(58) Field of Classification Search ............. 713/170
See application file for complete search history.

(56) References Cited

FOREIGN PATENT DOCUMENTS

| EP | 0 311 470 A1 | 4/1989 |
| EP | 0 792 044 A2 | 8/1997 |
| WO | WO 89/11706 | 11/1989 |
| WO | WO 96/33567 | 10/1996 |

OTHER PUBLICATIONS

"Fast Decipherment Algorithm for RSA Public-Key Cryptosystem" by J. Quisquater et al., *Electronics Letter* vol. 18, No. 21, XP 00057731, pp. 905-907, Oct. 14, 1982.

*Primary Examiner*—Emmanuel L. Moise
*Assistant Examiner*—Tamara Teslovich
(74) *Attorney, Agent, or Firm*—Steven M. Koehler; Westman, Champlin & Kelly, P.A.

(57) ABSTRACT

The invention concerns a method whereby the proof is established by: $m(\geq 1)$ pairs of private $Q_i$ and public $G_i = g_i^2$ values; a public module n formed by the product of $f(\geq 2)$ prime factors; an exponent $v = 2^k (k>1)$, linked by the relationships of the type: $G_i \cdot Q_i^v \equiv 1 \mod n$ or $G_i \equiv Q_i^v \mod n$. Among the m numbers obtained by increasing $Q_i$ or its inverse modulo n to modulo n square, $k-1$ times rank, at least one of them is different from $\pm g_i$. Among the $2m$ equations: $x^2 \equiv g_i \mod n$, $x^2 \equiv -g_i \mod n$, at least one of them has solutions in x in the ring of modulo n integers.

11 Claims, 3 Drawing Sheets

METHOD, SYSTEM, DEVICE FOR PROVING AUTHENTICITY OF AN ENTITY OR INTEGRITY OF A MESSAGE

CROSS-REFERENCE TO RELATED APPLICATION

This Application is a Section 371 National Stage of International Application No. PCT/FR00/02717 filed Sep. 29, 2000, published Apr. 12, 2001 as WO 01/26279, not in English.

BACKGROUND OF THE INVENTION

The present invention relates to the methods, systems and devices designed to prove the authenticity of an entity and/or the integrity and/or authenticity of a message.

The patent EP 0 311 470 B1, whose inventors are Louis Guillou and Jean-Jacques Quisquater, describes such a method. Hereinafter, reference shall be made to their work by the terms "GQ patent" or "GQ method". Hereinafter, the expression "GQ2", or "GQ2 invention" or "GQ2 technology" shall be used to describe the present invention.

According to the GQ method, an entity known as a "trusted authority" assigns an identity to each entity called a "witness" and computes its RSA signature. In a customizing process, the trusted authority gives the witness an identity and signature. Thereafter, the witness declares the following: "Here is my identity; I know its RSA signature". The witness proves that he knows the RSA signature of his identity without revealing it. Through the RSA public identification key distributed by the trusted authority, an entity known as a "controller" ascertains, without obtaining knowledge thereof, that the RSA signature corresponds to the declared identity. The mechanisms using the GQ method run "without transfer of knowledge". According to the GQ method, the witness does not know the RSA private key with which the trusted authority signs a large number of identities.

The GQ technology described above makes use of RSA technology. However, whereas RSA technology truly depends on the factorization of the modulus n, this dependence is not an equivalence, indeed far from it, as can be seen in what are called "multiplicative attacks" against the various standards of digital signatures implementing RSA technology.

The goal of the GQ2 technology is twofold: on the one hand, to improve the performance characteristics of RSA technology and, on the other hand, to avert the problems inherent in RSA technology. Knowledge of the GQ2 private key is equivalent to knowledge of the factorization of the modulus n. Any attack on the triplets GQ2 leads to factorization of the modulus n: this time there is equivalence. With the GQ2 technology, the work load is reduced both for the signing or self-authenticating entity and for the controller entity. Through a better use of the problem of factorizing in terms of both security and performance, the GQ2 technology averts the drawbacks of RSA technology.

The GQ method implements modulo computations of numbers comprising 512 bits or more. These computations relate to numbers having substantially the same size raised to powers of the order of $2^{16}+1$. But existing microelectronic infrastructures, especially in the field of bank cards, make use of monolithic self-programmable microprocessors without arithmetical coprocessors. The work load related to the multiple arithmetical applications involved in methods such as the GQ method leads to computation times which, in certain cases, prove to be disadvantageous for consumers using bank cards to pay for their purchases. It may be recalled here that, in seeking to increase the security of payment cards, the banking authorities have raised a problem that is particularly difficult to solve. In fact, two apparently contradictory questions have to be examined: on the one hand, increasing security by using increasingly lengthy and distinct keys for each card while, on the other hand, preventing the work load from leading to excessive computation times for the users. This problem becomes especially acute inasmuch as it is also necessary to take account of the existing infrastructure and the existing microprocessor components.

The GQ2 technology is aimed at providing a solution to this problem while still increasing security.

Method

SUMMARY OF THE INVENTION

More particularly, the invention relates to a method designed to prove the following to a controller entity:
the authenticity of an entity and/or
the integrity of a message M associated with this entity.

This proof is established by means of all or part of the following parameters or derivatives of these parameters:

m pairs of private values $Q_1, Q_2, \ldots Q_m$ and public values $G_1, G_2, \ldots G_m$ (m being greater than or equal to 1), a public modulus n constituted by the product of f prime factors $p_1, p_2, \ldots p_f$ (f being greater than or equal to 2).

Said modulus and said private and public values are related by relationships of the type:

$$G_i \cdot Q_i^v \equiv 1 \bmod n \text{ or } G_i \equiv Q_i^v \bmod n$$

where v represents a public exponent of the type $$v=2^k$$

where k is a security parameter greater than 1, said m public values $G_i$ being the squares $g_i^2$ of m distinct base numbers $g_1, g_2, \ldots g_m$ inferior to the f prime factors $p_1, p_2, \ldots p_f$; said f prime factors $p_1, p_2, \ldots p_f$ and/or said m base numbers $g_1, g_2, \ldots g_m$ being produced in such a way that the following conditions are satisfied.

First Condition:

According to the first condition, each of the equations $$x^v \equiv g_i^2 \bmod n \tag{1}$$

has solutions in x in the ring of integers modulo n.

Second Condition:

According to the second condition, in the case where $G_i \equiv Q_i^v \bmod n$, among the m numbers $q_i$ obtained by raising $Q_i$ to the square modulo n, k−1 rank times, one of them is different from $\pm g_i$ (that is to say non-trivial).

According to the second condition, in the case where $G_i \cdot Q_i^v \equiv 1 \bmod n$, among the m numbers $q_i$ obtained by raising the inverse of $Q_i$ modulo n to the square modulo n, k−1 rank times, one of them is different from $\pm g_i$ (that is to say non-trivial).

It is to be noted here that according to current notation $\pm g_i$ represents the number $g_i$ and $n-g_i$.

Third Condition:

According to the third condition, among the 2 m equations:

$$x^2 \equiv g_i \bmod n \tag{2}$$

$$x^2 \equiv -g_i \bmod n \tag{3}$$

at least one of them has solutions in x in the ring of integers modulo n.

The method implements an entity called a witness in the steps defined here below. Said witness entity has f prime factors $p_i$ and/or m base numbers $g_i$ and/or parameters of the Chinese remainders of the prime factors and/or the public modulus n and/or the m private values $Q_i$ and/or the f.m components $Q_{i,j}$ ($Q_{i,j} \equiv Q_i \mod p_j$) of the private values $Q_i$ and of the public exponent v.

The witness computes commitments R in the ring of integers modulo n. Each commitment is computed either by:
performing operations of the type $R \equiv r^v \mod n$ Where r is a random value such that 0<r<n,
or
** by performing operations of the type $R_i \equiv r_i^v \mod p_i$ where $r_i$ is a random value associated with the prime number $p_i$ such that $0 < r_i < p_i$, each $r_i$ belonging to a collection of random values $\{r_1, r_2, \ldots, r_f\}$,
** then by applying the Chinese remainder method.

The witness receives one or more challenges d. Each challenge d comprises m integers $d_i$ hereinafter called elementary challenges. The witness, on the basis of each challenge $d_i$ computes a response D,
either by performing operations of the type:

$D \equiv r \cdot Q_1^{d1} \cdot Q_2^{d2} \cdot Q_m^{dm} \mod n$ or
** by performing operations of the type:

$D_i \equiv r_i \cdot Q_{i,1}^{d1} \cdot Q_{i,2}^{d2} \cdots Q_{i,m}^{dm} \mod p_i$

** then by applying the Chinese remainder method.

The method is such that there are as many responses D as there are challenges d as there are commitments R. Each group of numbers R, d, D forms a triplet referenced {R, d, D}.

Case of the Proof of the Authenticity of an Entity

In a first variant of an embodiment, the method according to the invention is designed to prove the authenticity of an entity known as a demonstrator to an entity known as the controller. Said demonstrator entity comprises the witness. Said demonstrator and controller entities execute the following steps:

Step 1: Act of Commitment R
At each call, the witness computes each commitment R by applying the process specified above. The demonstrator sends the controller all or part of each commitment R.

Step 2: Act of Challenge d
The controller, after having received all or part of each commitment R, produces challenges d equal in number to the number of commitments R and sends the challenges d to the demonstrator.

Step 3: Act of Response D
The witness computes the responses D from the challenges d by applying the process specified above.

Step 4: Act of Checking
The demonstrator sends each response D to the controller.

First Case: The Demonstrator has Transmitted a Part of Each Commitment R.

If the demonstrator has transmitted a part of each commitment R, the controller, having the m public values $G_1$, $G_2, \ldots, G_m$, computes a reconstructed commitment R', from each challenge d and each response D, this reconstructed commitment R' satisfying a relationship of the type $R' \equiv G_1^{d1} \cdot G_2^{d2} \cdots G_m^{dm} \cdot D^v \mod n$ or a relationship of the type $R' \equiv D^v/G_1^{d1} \cdot G_2^{d2} \cdots G_m^{dm} \mod n.$ The controller ascertains that each reconstructed commitment R' reproduces all or part of each commitment R that has been transmitted to it.

Second Case: The Demonstrator has Transmitted the Totality of Each Commitment R

If the demonstrator has transmitted the totality of each commitment R, the controller, having the m public values $G_1, G_2, \ldots, G_m$, ascertains that each commitment R satisfies a relationship of the type $R \equiv G_1^{d1} \cdot G_2^{d2} \cdots G_m^{dm} \cdot D^v \mod n$ or a relationship of the type $R \equiv D^v/G_1^{d1} \cdot G_2^{d2} \cdots G_m^{dm} \mod n.$ Case of the Proof of the Integrity of the Message In a second variant of an embodiment capable of being combined with the first one, the method according to the invention is designed to provide proof to an entity, known as the controller entity, of the integrity of a message M associated with an entity called a demonstrator entity. Said demonstrator entity comprises the witness.

Said demonstrator and controller entities perform the following steps:

Step 1: Act of Commitment R
At each call, the witness computes each commitment R by applying the process specified above.

Step 2: Act of Challenge d
The demonstrator applies a hashing function h whose arguments are the message M and all or part of each commitment R to compute at least one token T. The demonstrator sends the token T to the controller. The controller, after having received a token T, produces challenges d equal in number to the number of commitments R and sends the challenges d to the demonstrator.

Step 3: Act of Response D
The witness computes the responses D from the challenges d by applying the process specified above.

Step 4: Act of Checking
The demonstrator sends each response D to the controller. The controller, having the m public values $G_1, G_2, \ldots G_m$, computes a reconstructed commitment R', from each challenge d and each response D, this reconstructed commitment R' satisfying a relationship of the type:

$R' \equiv G_1^{d1} \cdot G_2^{d2} \cdots G_m^{dm} \cdot D^v \mod n$ or a relationship of the type $R' \equiv D^v/G_1^{d1} \cdot G_2^{d2} \cdots G_m^{dm} \mod n.$ Then the controller applies the hashing function h whose arguments are the message M and all or part of each reconstructed commitment R' to reconstruct the token T'. Then the controller ascertains that the token T' is identical to the token T transmitted.

Digital Signature of a Message and Proof of its Authenticity

In a third variant of an embodiment according to the invention, capable of being combined with the two preceding embodiments, the method according to the invention is designed to produce the digital signature of a message M by an entity known as the signing entity. Said signing entity includes the witness.

Signing Operation

Said signing entity executes a signing operation in order to obtain a signed message comprising:
the message M,
the challenges d and/or the commitments R,
the responses D.

Said signing entity executes the signing operation by implementing the following steps:

Step 1: Act of Commitment R

At each call, the witness computes each commitment R by applying the process specified above.

Step 2: Act of Challenge d

The signing entity applies a hashing function h whose arguments are the message M and each commitment R to obtain a binary train. From this binary train, the signing entity extracts challenges d in a number equal to the number of commitments R.

Step 3: Act of Response D

The witness computes the responses D from the challenges d by applying the process specified process above.

Checking Operation

To prove the authenticity of the message M, an entity called a controller checks the signed message. Said controller entity having the signed message carries out a checking operation by proceeding as follows, Case Where the Controller has Commitments R, Challenges d, Responses D If the controller has commitments R, challenges d, responses D, the controller ascertains that the commitments R, the challenges d and the responses D satisfy relationships of the type:

$$R \equiv G_1^{d1}.G_2^{d2}.G_m^{dm}.D^v \bmod n$$

or relationships of the type:

$$R \equiv D^v/G_1^{d1}.G_2^{d2}.G_m^{dm} \bmod n.$$

Then the controller ascertains that the message M, the challenges d and the commitments R satisfy the hashing function:

$$d = h(\text{message}, R)$$

Case Where the Controller has Challenges d and Responses D

If the controller has challenges d and responses D, the controller, on the basis of each challenge d and each response D, reconstructs commitments R' satisfying relationships of the type:

$$R' \equiv G_1^{d1}.G_2^{d2}.\ldots G_m^{dm}.D^v \bmod n$$

or relationships of the type:

$$R' \equiv D^v/G_1^{d1}.G_2^{d2}.\ldots G_m^{dm}. \bmod n.$$

Then the controller ascertains that the message M and the challenges d satisfy the hashing function:

$$D = h(\text{message}, R')$$

Case Where the Controller has Commitments R and Responses D

If the controller has commitments R and responses D, the controller applies the hashing function and reconstructs d'

$$d' = h(\text{message}, R).$$

Then the controller ascertains that the commitments R, the challenges d' and the responses D satisfy relationships of the type:

$$R \equiv G_1^{d'1}.G_2^{d'2}.G_m^{d'm}.D^v \bmod n$$

or relationships of the type:

$$R \equiv D^v G_1^{d'1}.G_2^{d'2}.\ldots G_m^{d'm}. \bmod n.$$

System

The present invention also relates to a system designed to prove the following to a controller server:
the authenticity of an entity and/or
the integrity of a message M associated with this entity.

This proof is established by means of all or part of the following parameters or derivatives of these parameters:
m pairs of private values $Q_1, Q_2, \ldots Q_m$ and public values $G_1, G_2, \ldots G_m$ (m being greater than or equal to 1),
a public modulus n constituted by the product of f prime factors $p_1, p_2, \ldots p_f$ (f being greater than or equal to 2).

Said modulus, and said private and public values are linked by relationships of the type:

$$G_i.Q_i^v \equiv 1. \bmod n \text{ or } G_i \equiv Q_i^v \bmod n$$

v designating a public exponent of the type:

$$v = 2^k$$

where k is a security parameter greater than 1,
said m public values $G_i$ being the squares $g_i^2$ of distinct m base numbers $g_1, g_2, \ldots g_m$ inferior to the f prime factors $p_1, p_2, \ldots p_f$; said f prime factors $p_1, p_2, \ldots p_f$ and/or said m base numbers $g_1, g_2 \ldots g_m$ being produced such that the following conditions are satisfied.

First Condition

According to the first condition, each of the equations:

$$x^v \equiv g_i^2 \bmod n \quad (1)$$

can be solved in x in the ring of integers modulo n.

Second condition

According to the second condition, in the case where $G_i \equiv Q_i^v \bmod n$, among the m numbers $q_i$ obtained by raising $Q_i$ to the square modulo n, k−1 rank times, one of them is different from $\pm g_i$ (that is to say non trivial).

According to the second condition, in the case where $G_i.Q_i^v \equiv 1 \bmod n$, among the m numbers $q_i$ obtained by raising the inverse of $Q_i$ modulo n to the square modulo n, k−1 rank times, one of them is different from $\pm g_i$ (that is to say non trivial).

It is pointed out here that according to a current notation $\pm g_i$ represents the numbers $g_i$ and $n-g_i$.

Third Condition:

According to the third condition, among the 2 m equations:

$$x^2 \equiv g_i \bmod n \quad (2)$$

$$x^2 \equiv g_i \bmod n \quad (3)$$

at least one of them can be solved in x in the ring of integers modulo n.

Said system comprises a witness device, contained especially in a nomad object which, for example, takes the form of a microprocessor-based bank card. The witness device comprises a memory zone containing the f prime factors $p_i$ and/or the parameters of the Chinese remainders of the prime factors and/or the public modulus n and/or the m private values $Q_i$ and/or f.m components $Q_{i,j}(Q_{i,j} \equiv Q_i \bmod p_j)$ of the private values $Q_i$ and of the public exponent v. The witness device also comprises:

random value production means hereinafter called random value production means of the witness device, computation means, hereinafter called means for the computation of commitments R of the witness device.

The means of computation make it possible to compute commitments R in the ring of integers modulo n. Each commitment is computed either by performing operations of the type $$R \equiv r^v \bmod n$$

where r is a random value produced by the random factor production means, r being such that 0<r<n.

or by performing operations of the type $$R_i \equiv r_i^v \bmod p_i$$

where $r_i$ is a random value associated with the prime number $p_i$ such that $0 < r_i < p_i$, each $r_i$ belonging to a collection of random values $\{r_1, r_2, \ldots r_f\}$, produced by the random factor production means and then by applying the Chinese remainder method.

The witness device also comprises:

reception means hereinafter called the means for the reception of the challenges d of the witness device, to receive one or more challenges d; each challenge d comprising m integers $d_i$ hereinafter called elementary challenges.

computation means, hereinafter called means for the computation of the responses D of the witness device, for the computation on the basis of each challenge d, of a response D:

either by carrying out operations of the type:

$$D \equiv r \cdot Q_1^{d1} Q_2^{d2} \ldots Q_m^{dm} \bmod n$$

or by carrying out operations of the type:

$$D_i \equiv r_i \cdot Q_{i,1}^{d1} \cdot Q_{i,2}^{d2} \ldots Q_{i,m}^{dm} \bmod p_i$$

and then by applying the Chinese remainder method.

The witness device also comprises transmission means to transmit one or more commitments R and one or more responses D. There are as many responses D as there are challenges d as there are commitments R. Each group of numbers R, d, D forming a triplet referenced $\{R, d, D\}$.

Case of the Proof of the Authenticity of an Entity

In a first variant of embodiment, the system according to the invention is designed to prove the authenticity of an entity called a demonstrator to an entity called a controller.

Said system is such that it comprises a demonstrator device associated with a demonstrator entity. Said demonstrator device is interconnected with the witness device by interconnection means. It may especially take the form of logic microcircuits in a nomad object, for example the form of a microprocessor in a microprocessor-based bank card.

Said system also comprises a controller device associated with the controller entity. Said controller device especially takes the form of a terminal or remote server. Said controller device comprises connection means for its electrical, electromagnetic, optical or acoustic connection, especially through a computer communications network, to the demonstrator device.

Said system is used to execute the following steps:

Step 1: Act of Commitment R

At each call, the means of computation of the commitments R of the witness device compute each commitment R by applying the process specified above. The witness device comprises means of transmission, hereinafter called the transmission means of the witness device, to transmit all or part of each commitment R to the demonstrator device through the interconnection means. The demonstrator device also comprises transmission means, hereinafter called the transmission means of the demonstrator, to transmit all or part of each commitment R to the controller device through the connection means.

Step 2: Act of Challenge d

The controller device comprises challenge production means for the production, after receiving all or part of each commitment R, of the challenges d equal in number to the number of commitments R. The controller device also comprises transmission means, hereinafter called the transmission means of the controller, to transmit the challenges d to the demonstrator through the connection means.

Step 3: Act of Response D

The means of reception of the challenges d of the witness device receive each challenge d coming from the demonstrator device through the interconnection means. The means of computation of the responses D of the witness device compute the responses D from the challenges d by applying the process specified above.

Step 4: Act of Checking

The transmission means of the demonstrator transmit each response D to the controller. The controller device also comprises:

computation means, hereinafter called the computation means of the controller device, comparison means, hereinafter called the comparison means of the controller device.

First Case: the Demonstrator has Transmitted a Part of Each Commitment R.

If the transmission means of the demonstrator have transmitted a part of each commitment R, the computation means of the controller device, having m public values $G_1, G_2, \ldots G_m$, compute a reconstructed commitment R', from each challenge d and each response D, this reconstructed commitment R' satisfying a relationship of the type:

$$R' \equiv G_1^{d1} \cdot G_2^{d2} \ldots G_m^{dm} \cdot D^v \bmod n$$

or a relationship of the type:

$$R' \equiv D^v / G_1^{d1} \cdot G_2^{d2} \ldots G_m^{dm} \bmod n.$$

The comparison means of the controller device compare each reconstructed commitment R' with all or part of each commitment R received.

Second Case: The Demonstrator has Transmitted the Totality of Each Commitment R

If the transmission means of the demonstrator have transmitted the totality of each commitment R, the computation means and the comparison means of the controller device, having m public values $G_1, G_2, \ldots, G_m$, ascertain that each commitment R satisfies a relationship of the type:

$$R \equiv G_1^{d1} \cdot G_2^{d2} \ldots G_m^{dm} \cdot D^v \bmod n$$

or a relationship of the type:

$$R \equiv D^v / G_1^{d1} \cdot G_2^{d2} \ldots G_m^{dm} \bmod n.$$

Case of the Proof of the Integrity of a Message

In a second variant embodiment capable of being combined with the first one, the system according to the invention is designed to give proof to an entity, known as a controller of the integrity of a message M associated with an entity known as a demonstrator. Said system is such that it comprises a demonstrator device associated with the demonstrator entity. Said demonstrator device is interconnected with the witness device by interconnection means. It may especially take the form of logic microcircuits in a nomad object, for example in the form of a microprocessor in a microprocessor-based bank card. Said system also comprises a controller device associated with the controller entity. Said controller device especially takes the form of a terminal or remote server. Said controller device comprises connection means for its electrical, electromagnetic, optical or acoustic connection, especially through a data-processing communications network, to the demonstrator device.

Said system is used to execute the following steps:

Step 1: Act of Commitment R

At each call, the means of computation of the commitments R of the witness device compute each commitment R by applying the process specified above. The witness device has means of transmission, hereinafter called transmission means of the witness device, to transmit all or part of each commitment R to the demonstrator device through the interconnection means.

Step 2: Act of Challenge d

The demonstrator device comprises computation means, hereinafter called the computation means of the demonstrator, applying a hashing function h whose arguments are the message M and all or part of each commitment R to compute at least one token T. The demonstrator device also comprises transmission means, hereinafter known as the transmission means of the demonstrator device, to transmit each token T through the connection means to the controller device. The controller device also has challenge production means for the production, after having received the token T, of the challenges d in a number equal to the number of commitments R. The controller device also has transmission means, hereinafter called the transmission means of the controller, to transmit the challenges d to the demonstrator through the connection means.

Step 3: Act of Response D

The means of reception of the challenges d of the witness device receive each challenge d coming from the demonstrator device through the interconnection means. The means of computation of the responses D of the witness device compute the responses D from the challenges d by applying the process specified above.

Step 4: Act of Checking

The transmission means of the demonstrator transmit each response D to the controller. The controller device also comprises computation means, hereinafter called the computation means of the controller device, having m public values $G_1, G_2, \ldots, G_m$, to firstly compute a reconstructed commitment R', from each challenge d and each response D, this reconstructed commitment R' satisfying a relationship of the type:

$$R' = G_1^{d1} \cdot G_2^{d2} \cdot \ldots \cdot G_m^{dm} \cdot D^v \bmod n$$

or a relationship of the type:

$$R' = D^v / G_1^{d1} \cdot G_2^{d2} \cdot \ldots \cdot G_m^{dm} \bmod n$$

and then, secondly, to compute a token T' by applying the hashing function h having as arguments the message M and all or part of each reconstructed commitment R'.

The controller device also has comparison means, hereinafter known as the comparison means of the controller device, to compare the computed token T' with the received token T.

Digital Signature of a Message and Proof of its Authenticity

In a third variant of an embodiment according to the invention, capable of being combined with one and/or the other of the first two embodiments, the system according to the invention is designed to prove the digital signature of a message M, hereinafter known as a signed message, by a n entity called a signing entity.

The signed message comprises:
the message M,
the challenges d and/or the commitments R,
the responses D.

Signing Operation

Said system is such that it comprises a signing device associated with the signing entity. Said signing device is interconnected with the witness device by interconnection means and may especially take the form of logic microcircuits in a nomad object, for example in the form of a microprocessor in a microprocessor-based bank card.

Said system is used to execute the following steps:

Step 1: Act of Commitment R

At each call, the means of computation of the commitments R of the witness device compute each commitment R by applying the process specified above. The witness device comprises means of transmission, hereinafter called the transmission means of the witness device, to transmit all or part of each commitment R to the signing device through the interconnection means.

Step 2: Act of Challenge d

The signing device comprises computation means, hereinafter called the computation means of the signing device, applying a hashing function h whose arguments are the message M and all or part of each commitment R to compute a binary train and extract, from this binary train, challenges d whose number is equal to the number of commitments R.

Step 3: Act of Response D

The means for the reception of the challenges d of the witness device receive each challenge d coming from the signing device through the interconnection means. The means for computing the responses D of the witness device compute the responses D from the challenges d by applying the process specified above. The witness device comprises transmission means, hereinafter called means of transmission of the witness device, to transmit the responses D to the signing device, through the interconnection means.

Checking Operation:

To prove the authenticity of the message M, an entity known as the controller checks the signed message.

Said system comprises a controller device associated with the controller entity. Said controller device especially takes the form of a terminal or remote server. Said controller device comprises connection means for its electrical, electromagnetic, optical or acoustic connection, especially through a computer communications network, to the signing device.

Said signing device associated with the signing entity comprises transmission means, hereinafter known as the transmission means of the signing device, for the transmission, to the controller device, of the signed message through the connection means. Thus the controller device has a signed message comprising:
the message M,
the challenges d and/or the commitments R.
the responses D.
The controller device comprises:
computation means hereinafter called the computation means of the controller device, comparison means, hereinafter called the comparison means of the controller device.

Case Where the Controller Device has Commitments R, Challenges d, Responses D

If the controller device has commitments R, challenges d, responses D, the computation and comparison means of the controller device ascertain that the commitments R, the challenges d and the responses D satisfy relationships of the type $$R \equiv G_1^{d1}.G_2^{d2}.G_m^{dm}.D^v \bmod n$$

or relationships of the type:

$$R \equiv D^v/G_1^{d1}.G_2^{d2}.\ldots G_m^{dm} \bmod n.$$

Then, the computation and comparison means of the controller device ascertain that the message M, the challenges d and the commitments R satisfy the hashing function:

$$d = h(\text{message}, R)$$

Case Where the Controller Device has Challenges d and Responses D

If the controller has challenges d and responses D, the computation means of the controller reconstruct, on the basis of each challenge d and each response D, commitments R' satisfying relationships of the type $$R' \equiv G_1^{d1}.G_2^{d2}.\ldots G_m^{dm}.D^v \bmod n$$

or relationships of the type:

$$R' \equiv D^v/G_1^{d1}.G_2^{d2}.G_m^{dm} \bmod n.$$

Then the computation and comparison means of the controller device ascertain that the message M and the challenges d satisfy the hashing function:

$$d = h(\text{message}, R')$$

Case Where the Controller has Commitments R and Responses D

If the controller device has commitments R and responses D, the computation means of the controller device apply the hashing function and compute d' such that:

$$d' \equiv h(\text{message}, R)$$

Then the computation and comparison means of the controller device ascertain that the commitments R, the challenges d' and the responses D satisfy relationships of the type:

$$R \equiv G_1^{d'1}.G_2^{d'2}.\ldots G_m^{d'm}.D^v \bmod n$$

or relationships of the type:

$$R \equiv D^v/G_1^{d'1}.G_2^{d'2}.\ldots G_m^{d'm} \bmod n.$$

Terminal Device

The invention also relates to a terminal device associated with an entity. The terminal device especially takes the form of a nomad object, for example the form of a microprocessor in a microprocessor-based bank card, The terminal device is designed to prove the following to a controller device:

the authenticity of an entity and/or the integrity of a message M associated with this entity.

This proof is established by means of all or part of the following parameters or derivatives of these parameters:

m pairs of private values $Q_1, Q_2, \ldots Q_m$ and public values $G_1, G_2, \ldots G_m$ (m being greater than or equal to 1), a public module n constituted by the product of f prime factors $p_1, p_2, \ldots p_f$ (f being greater than or equal to 2).

Said module and said private and public values are related by relationships of the type $$G_i \cdot Q_i^v \equiv 1 \bmod n \text{ or } G_i \equiv Q_i^v \bmod n$$

v designating a public exponent of the type $$v = 2^k$$

where k is a security parameter greater than 1.

Said m public values $G_i$ are the squares $g_i^2$ of m distinct base numbers $g_1, g_2, \ldots g_m$ inferior to the f prime factors $p_1, p_2, \ldots p_f$; said f prime factors $p_1, p_2, \ldots p_f$ and/or said m base numbers $g_1, g_2, g_m$ being produced such that the following conditions are satisfied.

First Condition

According to the first condition, each of the equations:

$$x^v \equiv g_i^2 \bmod n \qquad (1)$$

can be solved in x in the ring of integers modulo n.

Second Condition

According to the second condition, in the case where $G^1 \equiv Q_i^v \bmod n$, among the m numbers $q_i$ obtained by raising $Q_i$ to the square modulo n, k−1 times, one of them is different from $\pm g_i$ (that is to say non trivial).

According to the second condition, in the case where $G_i \cdot Q_i^v \equiv 1 \bmod n$, among the m numbers $q_i$ obtained by raising the inverse of $Q_i$ modulo n to the square modulo n, k−1 times, one of them is different from $\pm g_i$ (that is to say non trivial).

It is pointed out here that according to a current notation $\pm g_i$ represents the numbers $g_i$ and $n-g_i$.

Third Condition:

According to the third condition, among the 2 m equations:

$$x^2 \equiv g_i \bmod n \qquad (2)$$

$$x^2 \equiv g_i \bmod n \qquad (3)$$

at least one of them can be solved in x in the ring of integers modulo n.

Said terminal device comprises a witness device comprising a memory zone containing the f prime factors $p_i$ and/or the parameters of the Chinese remainders of the prime factors and/or the public modulus n and/or the m private values $Q_i$ and/or f.m components $Q_{i,j}$ ($Q_{i,j} = Q_j \bmod p_j$) of the private values $Q_i$ and of the public exponent v.

The witness device also comprises:

random value production means hereinafter called random value production means of the witness device, computation means, hereinafter called means for the computation of commitments R of the witness device in the ring of the integers modulo n.

Each commitment is computed
either by performing operations of the type:

$$R \equiv r^v \bmod n$$

where r is a random value produced by the random value production means, r being such that $0 < r < n$.

or by performing operations of the type:

$$R_i \equiv r_i^v \bmod p_i$$

where $r_i$ is a random value associated with the prime number $p_i$ such that $0 < r_i < p_i$, each $r_i$ belonging to a collection of random values $\{r_1, r_2, \ldots r_f\}$ produced by the random value production means, then by applying the Chinese remainder method.

The witness device also comprises:

reception means hereinafter called the means for the reception of the challenges d of the witness device, to receive one or more challenges d, each challenge d comprising m integers $d_i$ hereinafter called elementary challenges;

computation means, hereinafter called means for the computation of the responses D of the witness device, for the computation, on the basis of each challenge d, of a response D, either by performing operations of the type:

$$D = r \cdot Q_1^{d1} \cdot Q_2^{d2} \cdot \ldots \cdot Q_m^{dm} \bmod n$$

or by performing operations of the type:

$$D = r_i \cdot Q_{i,1}^{d1} \cdot Q_{i,2}^{d2} \cdot \ldots \cdot Q_{i,m}^{dm} \bmod p_i$$

and then by applying the Chinese remainder method.

Said witness device also comprises transmission means to transmit one or more commitments R and one or more responses D. There are as many responses D as there are challenges d as there are commitments R. Each group of numbers R, d, D forms a triplet referenced {R, d, D}.

Case of the Proof of the Authenticity of an Entity

In a first embodiment variant, the terminal device according to the invention is designed to prove the authenticity of an entity called a demonstrator to an entity called a controller.

Said terminal device is such that it comprises a demonstrator device associated with a demonstrator entity. Said demonstrator device is interconnected with the witness device by interconnection means. It may especially take the form of logic microcircuits in a nomad object, for example the form of a microprocessor in a microprocessor-based bank card.

Said demonstrator device also comprises connection means for its electrical, electromagnetic, optical or acoustic connection, especially through a data-processing communications network, to the controller device associated with the controller entity. Said controller device especially takes the form of a terminal or remote server.

Said terminal device is used to execute the following steps:

Step 1: Act of Commitment R

At each call, the means of computation of the commitments R of the witness device compute each commitment R by applying the process specified above.

The witness device has means of transmission, hereinafter called transmission means of the witness device, to transmit all or part of each commitment R to the demonstrator device through the interconnection means. The demonstrator device also has transmission means, hereinafter called the transmission means of the demonstrator, to transmit all or part of each commitment R to the controller device, through the connection means Steps 2 and 3: Act of Challenge d, Act of Response D The means of reception of the challenges d of the witness device receive each challenge d coming from the controller device through the connection means between the controller device and the demonstrator device and through the interconnection means between the demonstrator device and the witness device. The means of computation of the responses D of the witness device compute the responses D from the challenges d by applying the process specified above.

Step 4: Act of Checking

The transmission means of the demonstrator transmit each response D to the controller device that carries out the check.

Case of the Proof of the Integrity of a Message

In a second embodiment variant capable of being combined with the first embodiment, the terminal device according to the invention is designed to give proof to a n entity, known as a controller, of the integrity of a message M associated with an entity known as a demonstrator. Said terminal device is such that it comprises a demonstrator device associated with the demonstrator entity, said demonstrator device being interconnected with the witness device by interconnection means. It may especially take the form of logic microcircuits in a nomad object, for example the form of a microprocessor in a microprocessor-based bank card. Said demonstrator device comprises connection means for its electrical, electromagnetic, optical or acoustic connection, especially through a data-processing communications network, to the controller device associated with the controller entity. Said controller device especially takes the form of a terminal or remote server.

Said terminal device is used to execute the following steps:

Step 1: Act of Commitment R

At each call, the means of computation of the commitments R of the witness device compute each commitment R by applying the process specified above. The witness device has means of transmission, hereinafter called the transmission means of the witness device, to transmit all or part of each commitment R to the demonstrator device through the interconnection means.

Steps 2 and 3: Act of Challenge d, Act of Response D

The demonstrator device comprises computation means, hereinafter called the computation means of the demonstrator, applying a hashing function h whose arguments are the message M and all or part of each commitment R, to compute at least one token T. The demonstrator device also has transmission means, hereinafter known as the transmission means of the demonstrator device, to transmit each token T, through the connection means, to the controller device.

Said controller device, after having received the token T, produces challenges d in a number equal to the number of commitments R The means of reception of the challenges d of the witness device receive each challenge d coming from the controller device through the interconnection means between the controller device and the demonstrator device and through the interconnection means between the demonstrator device and the witness device. The means of computation of the responses D of the witness device compute the responses D from the challenges d by applying the process specified above.

Step 4: Act of Checking

The transmission means of the demonstrator send each response D to the controller device which performs the check.

Digital Signature of a Message and Proof of its Authenticity

In a third embodiment variant, capable of being combined with either one of the first two, the terminal device according to the invention is designed to produce the digital signature of a message M, hereinafter known as the signed message, by an entity called a signing entity.

The signed message comprises:

the message M, the challenges d and/or the commitments R, the responses D.

Said terminal device is such that it comprises a signing device associated with the signing entity. Said signing device is interconnected with the witness device by interconnection means. It may especially take the form of logic microcircuits in a nomad object, fox example the form of a microprocessor in a microprocessor-based bank card. Said signing device comprises connection means for its electrical, electromagnetic, optical or acoustic connection, especially through a data-processing communications network, to the controller device associated with the controller entity. Said controller device especially takes the form of a terminal or remote server.

Signing Operation:

Said terminal device is used to execute the following steps:

Step 1: Act of Commitment R

At each call, the means of computation of the commitments R of the witness device compute each commitment R by applying the process specified above. The witness device comprises means of transmission, hereinafter called the transmission means of the witness device, to transmit all or part of each commitment R to the signing device through the interconnection means.

Step 2: Act of Challenge d

The signing device comprises computation means, hereinafter called the computation means of the signing device, applying a hashing function h whose arguments are the message M and all or part of each commitment R, to compute a binary train and extract, from this binary train, challenges d whose number is equal to the number of commitments R.

Step 3: Act of Response D

The means for the reception of the challenges d receive each challenge d coming from the signing device through the interconnection means. The means for computing the responses D of the witness device compute the responses D from the challenges d by applying the process specified above. The witness device comprises transmission means, hereinafter called means of transmission of the witness device, to transmit the responses D to the signing device, through the interconnection means.

Controller Device

The invention also relates to a controller device. The controller device may especially take the form of a terminal or remote server associated with a controller entity. The controller device is designed to check:

the authenticity of an entity and/or the integrity of a message M associated with this entity.

This proof is established by means of all or part of the following parameters or derivatives of these parameters:

m pairs of public values $G_1, G_2, \ldots G_m$ (m being greater than or equal to 1), a public modulus n constituted by the product of f prime factors $p_1, p_2, \ldots p_f$ (f being greater than or equal to 2), unknown to the controller device and the associated controller entity.

Said modulus and said private and public values are related by relationships of the type $$G_i \cdot Q_i^v = 1 . \bmod n \text{ or } G_i = Q_i^v \bmod n$$

v designating a public exponent of the type:

$$v = 2^k$$

where k is a security parameter greater than 1.

Said m public values $G_i$ being the squares $g_i^2$ of m distinct base numbers $g_1, g_2, \ldots g_m$ inferior to the f prime factors $p_1, p_2, \ldots p_f$; said f prime factors $p_1, p_2, \ldots p_f$ and/or said m base numbers $g_1, g_2, \ldots g_m$ being produced such that the following conditions are satisfied.

First Condition

According to the first condition, each of the equations:

$$x^v = g_i^2 \bmod n \tag{1}$$

can be solved in x in the ring of integers modulo n.

Second Condition

According to the second condition, in the case where $G_i = Q_i^v . \bmod n$, among the m numbers $q_i$ obtained by raising $Q_i$ to the square modulo n, k−1 rank times, one of them is different from $\pm g_i$ (that is to say non trivial).

According to the second condition, in the case where $G_i \cdot Q_i^v = 1 \bmod n$, among the m numbers $q_i$ obtained by raising the inverse of $Q_i$ modulo n to the square modulo n, k−1 rank times, one of them is different from $\pm g_i$ (that is to say non trivial).

It is pointed out here that according to a current notation $\pm g_i$ represents the numbers $g_i$ and $n-g_i$.

Third Condition

According to the third condition, among the 2 m equations:

$$x^2 = g_i \bmod n \tag{2}$$

$$x^2 = g_i \bmod n \tag{3}$$

at least one of them can be solved in x in the ring of integers modulo n.

Case of the Proof of the Authenticity of an Entity

In a first embodiment variant, the controller device according to the invention is designed to prove the authenticity of an entity called a demonstrator and an entity called a controller.

Said controller device comprises connection means for its electrical, electromagnetic, optical or acoustic connection, especially through a data-processing communications network, to a demonstrator device associated with the demonstrator entity.

Said controller device is used to execute the following steps:

Steps 1 and 2: Act of Commitment R, Act of Challenge d

Said controller device also has means for the reception of all or part of the commitments R coming from the demonstrator device through the connection means.

The controller device comprises challenge production means for the production, after receiving all or part of each commitment R, of the challenges d in a number equal to the number of commitments R, each challenge d comprising m integers $d_i$ hereinafter called elementary challenges.

The controller device also comprises transmission means, hereinafter called transmission means of the controller, to transmit the challenges d to the demonstrator through the connection means.

Steps 3 and 4: Act of Response D, Act of Checking

The controller device also comprises:

means for the reception of the responses D coming from the demonstrator device, through the connection means, computation means, hereinafter called the computation means of the controller device, comparison means, hereinafter called the comparison means of the controller device.

First Case: the Demonstrator has Transmitted a Part of Each Commitment R.

If the reception means of the controller device have received a part of each commitment R, the computation means of the controller device, having m public values $G_1$, $G_2, \ldots G_m$, compute a reconstructed commitment R', from each challenge d and each response D, this reconstructed commitment R' satisfying a relationship of the type:

$$R' \equiv G_1^{d1}.G_2^{d2}.\ldots.G_m^{dm}.D^v \bmod n$$

or a relationship of the type:

$$R' \equiv D^v/G_1^{d1}.G_2^{d2}.\ldots.G_m^{dm} \bmod n.$$

The comparison means of the controller device compare each reconstructed commitment R' with all or part of each commitment R received.

Second Case: the Demonstrator has Transmitted the Totality of Each Commitment R

If the reception means of the controller device have received the totality of each commitment R, the computation means and the comparison means of the controller device, having m public values $G_1, G_2, \ldots G_m$, ascertain that each commitment R satisfies a relationship of the type:

$$R' \equiv G_1^{d1}.G_2^{d2}.\ldots.G_m^{dm}.D^v \bmod n$$

or a relationship of the type:

$$R' \equiv D^v/G_1^{d1}.G_2^{d2}.\ldots.G_m^{dm} \bmod n.$$

Case of the Proof of the Integrity of a Message

In a second embodiment variant capable of being combined with the first, the controller device according to the invention is designed to prove the integrity of a message M associated with an entity known as a demonstrator.

Said controller device comprises connection means for its electrical, electromagnetic, optical or acoustic connection, especially through a data-processing communications network, to a demonstrator device associated with the demonstrator entity.

Said controller device is used to execute the following steps:

Steps 1 and 2: Act of Commitment R, Act of Challenge d

Said controller device has means for the reception of tokens T coming from the demonstrator device through the connection means. The controller device has challenge production means for the production, after having received the token T, of challenges d in a number equal to the number of commitments R, each challenge d comprising m integers $d_i$ hereinafter called elementary challenges. The controller device also has transmission means, hereinafter called the transmission means of the controller, to transmit the challenges d to the demonstrator through the connection means.

Steps 3 and 4: Act of Response D, Act of Checking

Said controller device also comprises means for the reception of the responses D coming from the demonstrator device, through the connection means. Said controller device also comprises computation means, hereinafter called the computation means of the controller device, having m public values $G_1, G_2, \ldots G_m$, to first of all compute a reconstructed commitment R', from each challenge d and each response D, this reconstructed commitment R' satisfying a relationship of the type:

$$R' \equiv G_1^{d1}.G_2^{d2}.\ldots.G_m^{dm}.D^v \bmod n$$

or a relationship of the type:

$$R' \equiv D^v/G_1^{d1}.G_2^{d2}.\ldots.G_m^{dm} \bmod n$$

and then, secondly, to compute a token T' by applying a hashing function h having as arguments the message M and all or part of each reconstructed commitment R'.

The controller device also has comparison means, hereinafter called the comparison means of the controller device to compare the computed token T' with the received token T.

Digital Signature of a Message and Proof of its Authenticity

In a third embodiment variant, capable of being combined with either one or the other of the first two embodiments, the controller device according to the invention is designed to prove the authenticity of the message M by checking a signed message by means of an entity called a controller.

The signed message, sent by a signing device associated with a signing entity having a hashing function h (message, R) comprises:

the message M, the challenges d and/or the commitments R, the responses D.

Checking Operation

Said controller device comprises connection means for its electrical, electromagnetic, optical or acoustic connection, especially through a data-processing communications network, to a signing device associated with the signing entity. Said controller device receives the signed message from the signing device, through the connection means.

The controller device comprises:

computation means, hereinafter called the computation means of the controller device, comparison means, hereinafter called the comparison means of the controller device.

Case Where the Controller Device has Commitments R, Challenges d, Responses D:

If the controller device has commitments R, challenges d, responses D, the computation and comparison means of the controller device ascertain that the commitments R, the challenges d and the responses D satisfy relationships of the type $$R \equiv G_1^{d1}.G_2^{d2}.\ldots.G_m^{dm}.D^v \bmod n$$

or relationships of the type:

$$R \equiv D^v/G_1^{d1}.G_2^{d2}.\ldots.G_m^{dm} \bmod n.$$

Then the computation and comparison means of the controller device ascertain that the message M, the challenges d and the commitments R satisfy the hashing function:

$$d=h(\text{message}, R)$$

Case Where the Controller Device has Challenges d and Responses D:

If the controller device has challenges d and responses D, the computation means of the controller device can, on the basis of each challenge d and each response D, compute commitments R' satisfying relationships of the type:

$$R' \equiv G_1^{d1}.G_2^{d2}.\ldots.G_m^{dm}.D^v \bmod n$$

or relationships of the type:

$$R' \equiv D^v/G_1^{d1}.G_2^{d2}.\ldots.G_m^{dm} \bmod n$$

and then the computation and comparison means of the controller device ascertain that the message M and the challenges d satisfy the hashing function $$d=h(\text{message}, R')$$

Case Where the Controller Device has Commitments R and Responses D:

If the controller device has commitments R and responses D, the computation means of the controller device apply the hashing function and compute d' such that $$d'=h(\text{message}, R)$$

and then the computation and comparison means of the controller device ascertain that the commitments R, the challenges d' and the responses D satisfy relationships of the type $$R \equiv G_1^{d'1}.G_2^{d'2}.G_m^{d'm}.D^v \bmod n$$

or relationships of the type:

$$R \equiv D^v/G_1^{d'1}.G_2^{d'2}.G_m^{d'm \bmod} n.$$

DETAILED DESCRIPTION OF PREFERRED EMBODIMENTS

Figure 1A:
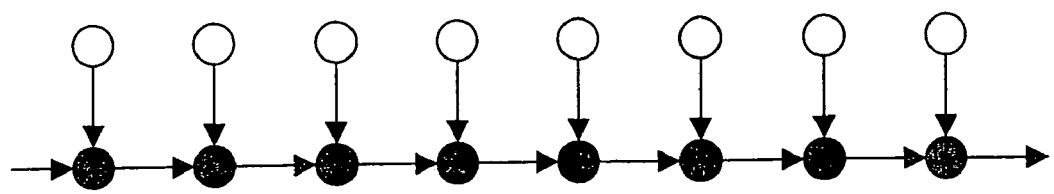
FIGS. 1A–1D, 2A, 2B, 3A and 3B are graphs useful in explaining the present invention.
Figure 1B:
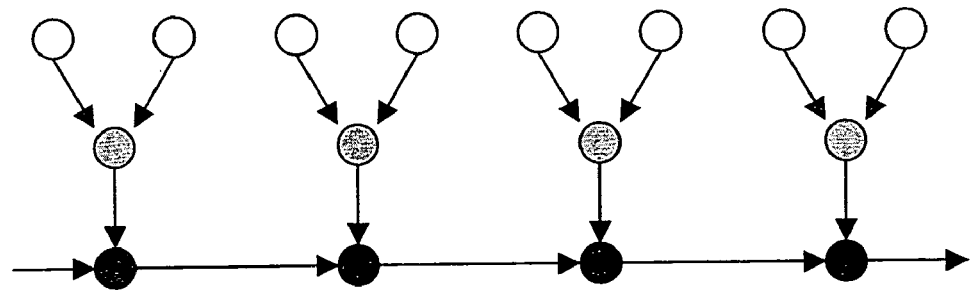
Figure 1C:
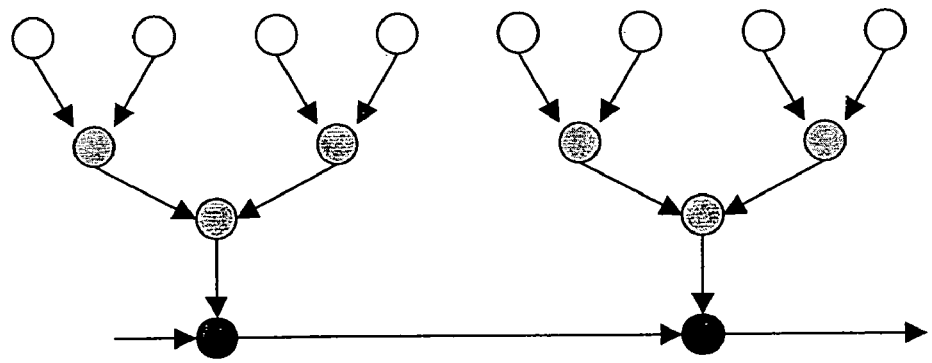
Figure 1D:
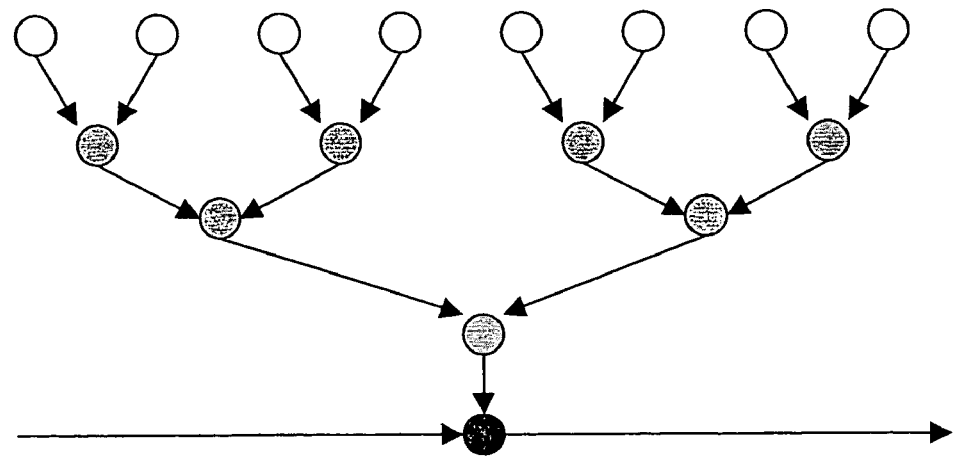

The goals of the GQ methods are the dynamic authentication of entities and messages together with the digital signature of messages. These are methods "without transfer of knowledge". An entity proves that it knows one or several private numbers. Another entity checks; it knows the corresponding public number or numbers. The proving entity wants to convince the checking entity without revealing the private number or numbers, in such a way as to be able to use them as many times as needed.

Each GQ method depends on a public modulus composed of secret high prime numbers. A public exponent v and a public modulus n together form a verification key <v,n> meaning "raise to the power v modulo n" and implement by means of one or several generic equations, all of the same type, direct: $G \equiv Q^v \pmod n$ or inverse $G \times Q^v \equiv 1 \pmod n$. The type has an effect on the operation of the calculations within the checking entity, but not within the proving entity; in fact, the security analyses confound the two types. Each generic equation linked to a public number G and a private number Q together form a pair of numbers {G,Q}. To resume, each GQ method implements one or several pairs of numbers {G,Q} for the same key <v,n>.

A classic version of the GQ method, here called GQ1, uses an RSA digital signature mechanism. The verification key <v,n> is then an RSA public key where the odd exponent v is preferably a prime number. Each GQ1 method in general uses a single pair of numbers {G,Q}: the public number G is deduced from identification data according to a format mechanism which is an integral part of the RSA digital signature technology. The private number Q or its inverse modulo n is an RSA signature for identification data. The proving entity shows its knowledge of an RSA signature of its own identification data and this proof does not reveal the signature which therefore remains secret, to be used as many times as needed.

The GQ1 methods generally implement two levels of keys: the RSA private signing key is reserved for an authority accrediting entities distinguishing themselves one from the other by identification data. Such a mechanism is said to be "identity based". Thus, an emitter of chip cards uses his RSA private key for the emission of each card to calculate a private number Q which is inscribed as diversified private key in the card; or furthermore, a client on a network of computers uses his RSA private key when entering each session to calculate a private number Q which will be the ephemeral private key of the client during the session. The proving entities, chip cards or clients in session, know an RSA signature of their identification data; they do not know the RSA private key which, in the key hierarchy, is at the next higher level. Nonetheless, dynamic authentication of entities by GQ1 with a modulus of 768 bits at the level of an authority requires almost the same work load as a dynamic authentication of entities by RSA with a modulus of 512 bits with three prime factors at the level of each entity, which allows the proving entity to use the Chinese remainder technique by calculating a modulo result for each of the prime factors before calculating a modulo result for their product.

However, the hierarchy of keys between an authority and the accredited entities is not obligatory. One can use GQ1 with a module belonging to the proving entity, which makes it possible to use the Chinese remainder technique to reduce the work loads of the proving entity, which does not change the work load of the checking entity fundamentally, apart from the fact that a modulus at the level of the proving entity can be shorter than a modulus at the level of the authority, for example 512 bits in comparison with 768 bits.

When the entity knows the prime factors of its own modulus, why call on an RSA digital signature mechanism??

Another version of GQ methods, here called elementary GQ2, treats directly the problem of factorization of a modulus n. In this context, "directly" means "without calling for the RSA signature". The aim of GQ2 is to reduce work loads, not only of the proving entity but also of the checking entity. The proving entity demonstrates knowledge of a breakdown of its own modulus and this proof does not reveal the breakdown which therefore remains secret, so as to be able to be used as often as needed. The security of the GQ2 protocol is equivalent to factorization of the module.

Each proving entity has its own modulus n. Each GQ2 mechanism implements a parameter k, a small number greater than 1 fixing a public exponent $v = 2^k$, and one or several pairs of numbers $\{G_1, Q_1\}$ to $\{G_m, Q_m\}$. Each public number $G_i$ is the square of a small number $g_i$ greater than 1 and called a "base number". All the proving entities can use the same public number or numbers $G_1$ to $G_m$. The factorization of the modulus n and the private number or numbers $Q_1$ to $Q_m$ are then at the same level in the key hierarchy. Each set of elementary GQ2 keys is defined by two necessary and sufficient conditions:

for each base number, neither of the two equations $x^2 \equiv \pm g_i \pmod n$ does not have a solution in x in the ring of integers modulo n, that is to say that the numbers $\pm g_i$ are two non-quadratic residues modulo n.

for each base number, the equation $x^v \equiv g_i^2 \pmod n$ where $v = 2^k$ has solutions in x in the ring of integers modulo n. The private number Qi or its inverse modulo n is any one of these solutions.

Taking into account the second condition, in order that the numbers $\pm g_i$ are two non-quadratic residues modulo n, the modulus n must comprise at least two prime factors congruent to 3 (mod 4) relative to which the Legendre symbol of $g_i$ differs. Consequently, any modulus composed of prime factors of which none or a single one is congruent to 3 (mod 4) does not allow a set of elementary GQ2 keys to be established, which privileges the prime factors congruent to 3 (mod 4). Thus, by taking high prime numbers at random, it appears that only half are congruent to 3 (mod 4) and half to 1 (mod 4). As a result, many RSA models in use cannot establish a set of elementary GQ2 keys.

Here we introduce the sets of generalised GQ2 keys to overcome this limitation in order to be able to use GQ2 technology with any modulus whatsoever, and in particular with any RSA modulus whatsoever: they depend on two necessary and sufficient principles.

The first principle reproduces the second elementary GQ2 condition:

For each base number $g_1$ to $g_m$, the equation $x^v \equiv g_i^2$ (mod n) where $v=2^k$ has solutions in x in the ring of integers modulo n.

Because the private number Q or its inverse modulo n is a solution to the equation, successive squares k−1 modulo n transform it into a number $q_i$ which is a square root of $G_i$ in the ring of integers modulo n. Depending on whether the number $q_i$ is equal to one of the two numbers $g_i$ or $n-g_i$, or different from the two numbers $g_i$ and $n-g_i$, it is said that it is trivial or not. When a number $q_i$ is non trivial, n which divides $q_i^2-g_i^2$ does not divide either $q_i-g_i$ or $q^i+g_i$. Any non trivial number q thus reveals a breakdown of the modulus n.

$$n = pgcd(n, q_i - g_i) \times pgcd(n, q_i + g_i)$$

The second principle widens the first elementary GQ2 condition:

among the numbers $q_1$ to $q_m$, at least one number $q_i$ is non trivial.

It is to be noted that if a number q+ exists while the numbers $\pm g_i$ are two non-quadratic residues in the ring of integers modulo n, the number $q_i$ is manifestly non trivial. Thus, the set of elementary GQ2 keys are certainly part of the set of generalised GQ2 keys which make it possible to use any modulus whatsoever, that is to say any composition of high prime numbers indifferently congruent to 3 or to 1 (mod 4) at least two of which are distinct. On the other hand, many sets of generalised GQ2 keys are not sets of elementary GQ2 keys. Each set of generalised GQ2 keys is in accordance with one of the following cases:

when the 2×m numbers $\pm g_1$ to $\pm g_m$ are all non-quadratic residues, this is a set of elementary GQ2 keys.

when among the 2×m numbers $\pm g_1$ to $\pm g_m$, there is at least one quadratic residue, this is not a set of elementary GQ2 keys, it is what is known here as a set of complementary GQ2 keys.

The present invention relates to the sets of complementary GQ2 keys, by definition these sets of generalised GQ2 keys not being elementary. Besides the two preceding principles, such a set must satisfy a third principle.

among the 2×m numbers $\pm g_1$ to $\pm g_m$, there is at least one quadratic residue.

In order to assess the problem and understand the solution we provide, that is to say the invention, let us first of all analyse the breakdown of the modulus n revealed by a non trivial number q, and then recall the Chinese remainder technique, and then the notion of rank in a Galois field CG(p); and next, study the functions "raise to the square" in CG(p) and "take a square root" of a quadratic residue in CG(p); and finally, analyse the applicability of the three principles stated above.

Analysis of the Breakdowns of the Module:

Just as the modulus n is broken down into f prime factors $p_1$ to $p_f$, the ring of integers modulo n is broken down into f Galois fields $CG(p_1)$ to $CG(p_f)$. In each field, there are two unit square roots, that is ±1. In the ring, there are thus $2^f$ unit square roots. Each private number $Q_i$ to $Q_m$ defines a number $\Delta_i = q_i/g_i$ (mod n) which is one of these $2^f$ unit square roots in the ring; in other words, n divides $\Delta i^2-1$.

when $q_i$ is trivial, that is to say $\Delta_i = \pm 1$, n divides $\Delta_i-1$, or $\Delta_i+1$ and therefore $\Delta_i$ does not reveal the breakdown of the modulus n.

when $q_i$ is non trivial, that is to say $\Delta_i \Delta \pm 1$, n does not divide either $\Delta_i-1$ or $\Delta_i+1$ and thus $\Delta$ reveals a breakdown, $n=pgcd(n, \Delta_i-1) \times pgcd(n, \Delta_i+1)$, resulting from the value of $\Delta_i$ in each field: the prime factor or factors dividing $\Delta_i-1$ on the one hand, this or these dividing $\Delta_i+1$ on the other.

Examination of the rules of multiplicative composition of the numbers q. Two numbers $\{q_1, q_2\}$ give a composite number $q_1 \times q_2$(mod n).

when $q_1$ is non trivial and $q_2$ is trivial, the composite number $q_1 \times q_2$(mod n) is non trivial; it reveals the same breakdown as $q_1$.

when $q_1$ and $q_2$ are non trivial and $\Delta_1 = \pm \Delta_2$ The composite number $q_1 \times q_2$(mod n) is trivial; it does not reveal any breakdown.

when $q_1$ and $q_2$ are non trivial and $\Delta 1 \neq \pm \Delta 2$, the composite number $q_1 \times q_2$(mod n) is non trivial; it reveals a third breakdown.

Three numbers $\{q_1, q_2, q_3\}$ give four composite numbers $\{q_1 \times q_2, q_1 \times q_3, q_2 \times q_3, q_1 \times q_2 \times q_3 \pmod{n}\}$, that is a total of seven numbers; m numbers thus provide $2^m-m-1$ composite numbers, that is a total of $2^m-1$ numbers.

We shall now consider a set of generalised GQ2 keys comprising i base numbers $g_1$ to $g_i$ and i private numbers $Q_1$ to $Q_i$ giving i numbers $q_1$ to $q_i$ and therefore i numbers $\Delta_1$ to $\Delta_i$ which are the unit roots. Let us try to take into account another base number $g_{i+1}$ by a private number $Q_{i+1}$ giving a number $q_{i+1}$ and thus a root $\Delta_{i+1}$.

The total of the $2^{i+1}-1$ numbers comprises as many non trivial numbers in each of the following cases.

the root $\Delta i+1$ is trivial and at least one root $\Delta 1$ to $\Delta_i$ is non trivial.

The root $\Delta_{i+1}$ is non trivial and figures among the 2×i roots $\pm \Delta_1$ and $\pm \Delta_i$.

In the case where the root $\Delta i+1$ is non trivial and does not figure among the 2×i roots $\pm \Delta_1$ to $\pm \Delta_i$, each composite number where $q_{i+1}$ figures is non trivial.

Consequently, when among the m numbers $q_1$ to $q_m$, at least one is non trivial, more than half the total of the $2^m-1$ numbers are non trivial.

By definition, it is said that l<f non trivial numbers $\{q_1, q_2, \ldots q_l\}$ are independent relative to the modulus n when each of the $2^l-1$ corresponding composite numbers is non trivial, that is to say that, in total, the $2^l-1$ numbers are all non trivial. Each of these $2^l-1$ numbers thus reveals a different breakdown of the modulus n.

When the f prime factors are distinct, there are $2^{f-1}-1$ breakdowns of the modulus n. Thus, if f−1 numbers q are independent, there is a bi-univocal correspondence between the $2^{f-1}-1$ breakdowns and a total of $2^{f-1}-1$ numbers comprising the f−1 independent numbers and the $2^{f-1}-f$ corresponding composite numbers.

Chinese Remainders

Either two numbers a and b, prime numbers between themselves such as 0<a<b, and two numbers $X_a$ from 0 to a−1 and $X_b$ from 0 to b−1; it concerns the determination of the unique number X from 0 to a×b−1 such that $X_a \equiv X$(mod a) and $X_b \equiv X$(mod b). The number $x \equiv \{b(\bmod a)\}^{-1}$(mod a) is the Chinese remainders parameter. The elementary Chinese remainders operation is given below:

$x \equiv X_b$(mod a)

$y = X_a - x$; if y is negative, replace y by y+a $z \equiv \alpha xy$(mod a)

$X = zxb + X_b$

To resume, one writes: X=Chinese Remainders $(X_a, X_b)$.

When f prime factors are arranged in increasing order, from the smallest $p_1$ to the biggest $p_f$, the Chinese remainder parameters can be the following (there is one less than the prime factors, that is to say f−1).

The first parameter is $x \equiv (p_2(\bmod p_1))^{-1}(\bmod p_1)$.

The second parameter is $\beta \equiv (p_1 \times p_2(\bmod p_3))^{-1}(\bmod p_3)$.

The i-th parameter is $\lambda \equiv (p_1 \times \ldots p_{i-1}(\bmod\ p_i))^{-1}(\bmod\ p_i)$.
And so on.

In f−1 elementary operations, one establishes a number X from 0 to n−1 starting from any set of f components from $X_1$ to $X_f$ with $X_j$ from 0 to $p_j$−1:

a first result (mod $p_1 \times p_2$) with the first parameter, then a second result (mod $p_1 \times p_2 \times p_3$) with the second parameter, until the final result (mod $n = p_1 \times p_2 \times \ldots p_f$) with the last parameter.

To resume, given the prime factors $p_1$ to $p_f$, each element of the ring of integers modulo n has two equivalent representations:

f numbers $X_1$ to $X_f$, a prime factor component: $X_j \equiv X(\bmod\ p_j)$, a number X from 0 to n−1, X=Chinese remainders ($X_1$, $X_2$, … $X_f$).

Rank of numbers in CG(p)—Let p be an odd prime number and a a number smaller than p i.e. 0<a<p. By definition, the rank of a with respect to p is the period of the sequence {X} defined by $\{x_i \equiv a;$ then, for $i \geq 1$, $x_{i+1} \equiv a \times x_i (\bmod\ p)\}$. By applying the Fermat theorem we obtain: $x_{i+p} \equiv a^p \times x_i \equiv a \times x_i \equiv x_{i+1}(\bmod\ p)$. Therefore, the rank of a number a with respect to a prime number p is p−1 or a divisor of p−1.

For example, when (p−1)/2 is an odd prime number p', the Galois field CG(p) includes a number of rank 1: this is 1, a number of rank 2: this is −1, p'−1 numbers of rank p' and p'−1 numbers of rank $2 \times p' = p - 1$. In CG(p), any number of rank p−1 is a "generator". The name is due to the fact that the successive powers of a generator in CG(p), i.e. the terms of the sequence {X} for indices from 1 to p'−1, form a permutation of all the non-zero elements of CG(p).

Let y be a generator of CG(p). Let us evaluate the rank of the number y' (mod y) according to i and p−1. When i is prime with p−1, this is p−1. When i divides p−1 this is (p−1)/i. In all cases, this is (p−1)/lgcd(p−1,i) (lgcd=largest common divisor).

By definition, Euler's function φ(n) is the number of numbers smaller than n and prime with n. In CG(p), there are φ(p−1)generators.

As an illustration, understanding the bases of the RSA is facilitated with the rank. Module n is the product of f prime factors p−1 to p−f, with $f \geq 2$. For each prime factor $p_i$ from $p_1$ to $p_f$ the public exponent e should be prime with $p_j$−1. Now, key <e,$p_j$> observes the rank of the elements of CG($p_j$): it permutates the elements of CG($p_j$); there exists a number $d_j$, generally as small as possible, such that $p_{-1}$ divides $e \times d_{j-1}$. The key <$d_j$, $p_j$> inverts the permutation of the elements of CG($p_j$). These f permutations, one in each field CG($p_1$) to CG($p_f$), are expressed in the ring of integers modulo n by the RSA permutation summarized by the public key <e, n>. There exists a number d, generally as small as possible, such that the smallest common multiple (scm) of ($P_1$, $P_{2-1}$, … $p_{f-1}$) divides $d \times e$−1. For each prime factor $p_j$ from $p_1$ to $p_f$, we have $d_j \equiv d\ (\bmod\ p_{j-1})$. The RSA permutation summarized by the public key <e, n> is inverted by the private key <d, n>.

Squares in CG(p)—Let us define a number t such that p−1 is dividable by $2^t$, but not by $2^{t-1}$. Each large prime number appears in one and only one category: t=1, t=2, t=3, t=4, and so forth. If a sufficiently large number of successive prime numbers are considered, about one out of two appears in the first category where p is congruent to 3 (mod 4), one out of four in the second one, where p is congruent to 5 (mod 8), one out of height in the third one, where p is congruent to 9 (mod 16), one out of sixteen in the fourth one, where p is congruent to 17 (mod 32), and so forth; on the average, one out of $2^t$ appears in the nth category where p is congruent to $2^{t+1}$ (mod $2^{t+1}$).

Because numbers x and p−x have the same square in CG(p), key <2,p> does not permutate CG(p). The function "take the square" in CG(p) may be represented by an orientated graph wherein each non-zero element of the field finds its place. Let us analyze the structure of the graph into branches and cycles according to the parity of the rank of each element.

The zero element is set. This is 0. Rank is not defined for the zero element to which no other element is related; the zero element is isolated.

The unit element is set. This is 1, the only element of rank 1. All the roots of unity in CG(p) are located in the branch related to 1. Let y be a non-quadratic residue of CG(p), any residue; key <p−1)$2^t$, p> transforms y into a primitive $2^{t-1}$th root of −1 referenced as b; indeed, we have $y^{(p-1)/2} \equiv -1(\bmod\ p)$. Therefore, in CG(p), the powers of b for exponents from 1 to $2^{t-1}$, are the $2^{t-1}$ roots of unity other than 1: they make up the branch related to 1.

The square of any element of even rank is another element the rank of which is divided by two. Therefore, each element of even rank is placed in a branch; each branch includes a rank number dividable by two, but not by four, next, if $t \geq 2$, two rank numbers dividable by four but not by eight, next, if $t \geq 3$, four rank numbers dividable by eight but not by sixteen, next, if $t \geq 4$, eight rank numbers dividable by sixteen but not by 32, and so forth. All the branches are similar to the branch related to 1; the $2^{t-1}$ leaves of each branch are non-quadratic residues; each branch includes $2^{t-1}$ elements and is related to an element of odd rank; there are (p−1)/$2^t$ branches which are all of the same length t.

The square of any element of odd rank other than the unit element is another element having the same rank. Key <2,p> permutates the set of (p−1)/$2^t$ elements of odd rank. The permutation is factorized into permutation cycles. The number of cycles depends on the factorization of (p−1)$2^t$. For each divider p' of (p−1)/$2^t$, there is a cycle including the φ(p') elements of rank p'. Let us recall that by definition, Euler's function φ(p') is the number of numbers smaller than p' and prime with p'. For example, when p' equals (p−1)/$2^t$, is prime, the p'−1 numbers of rank p' form a large permutation cycle.

FIGS. 1A–1D each illustrate a graph fragment for p congruent to 3 (mod 4), 5 (mod 8), 9 (mod 6) and 17 (mod 32), respectively.

The leaves on the branches are illustrated by white circles; these are non-quadratic residues.

The nodes in the branches are illustrated by grey circles; these are quadratic elements of even rank.

The nodes in the cycles are illustrated as black circles; these are quadratic elements of even rank.

Square roots in CG(p)—Knowing that a is a quadratic residue of CG(p), let us see how to calculate a solution to the equation $x^2 \equiv a\ (\bmod\ p)$ i.e. "take a square root" in CG(p). Of course, there are many ways for obtaining the same results; pages 31–36 of the book of Henri Cohen, *a Course in Computation Algebraic Number Theory*, published in 1993 by Springer in Berlin as volume 138 of the *Graduate Texts in Mathematics* series (GTM 138), may be consulted.

The number $s = (p - 1 + 2^t)/2^{t+1}$ provides a key <s, p>) which is:

<(p+1)/4, p> when p is congruent to 3 (mod 4),

<(p+3)/8, p> when p is congruent to 5 (mod 8),

<(p+7)/16, p> when p is congruent to 9 (mod 16),

<(p+15)/32, p> when p is congruent to 17 (mod 32), and so forth.

Key <s, p> transforms any element of a cycle into the previous element in the cycle. When a is of even rank, it is the solution of odd rank, we name it w. Indeed, in CG(p), $w^2/a$ is equal to a to the power of $(2\times(p-1+2^t)/<2^{t+1})-1=(p-1)/2^t$. The other solution is of even rank; this is p−w.

Generally, the key <s, p> transforms any quadratic residue a in a first approximation, into a solution which we name r. As a is a quadratic residue, the key $<2^{t-1}$, p> certainly transforms $r^2/a$ into 1. To approach a square root of a, let us take the power $2^{t-2}$ of $r^2/a$ (mod p) in order to obtain +1 or −1. The new approximation remains r if the result is +1 or else it becomes b×r (mod p) if the result is −1, knowing that p refers to any primitive $2^t$th root of 1 in the field CG(p). Therefore, the key $<2^{t-2}$, p> transforms the new approximation into 1. It may still be approached by using the key $<2^{t-3}$, p> and by multiplying with b2 (mod p) if necessary, and so forth.

The following algorithm solves the equation. It uses numbers a, b, p, r and t, as defined above and two variables: c represents the successive corrections and w the successive approximations. At the beginning of the algorithm, c=b and w=r. At the end of the calculation, the two solutions are w and p−w.

For i from t−2 to 1, repeat the following sequence:

Apply key $<2^t$, p> to number $w^3/a$ (mod p) in order to obtain +1 or −1.

When −1 is obtained, replace w by w×c (mod p).

Replace c by c2 (mod p).

Applicability of the principles—By definition we state that a parameter k, a base number g and a prime factor p are compatible when the equation $x^v \equiv g^2$ (mod p) where exponent v is $2^k$, has solutions in x in the field CG(p). Numbers k and g are small and larger than 1. Number p is a large prime number.

When t=1, i.e. p≡3 (mod 4), the equation has two solutions.

When t=2, i.e. p≡=5 (mod 8), according to the Legendre symbol of g with respect to p, the equation has four solutions if (g|p)=+1; it does not have any solution if (g|p)=−1.

When t>2, i.e. p≡1 (mod 8), let u be the number such that $2^u$ divides the rank of the public number $G=g^2$ with respect to p, but such that $2^{u+1}$ does not divide it; therefore, u is equal to one of the numbers from 0 to t−1. The equation has no solution if u>0 and k+u>t; it has $2^k$ solutions if k+u≦t; it has $2^t$ solutions if u=0 and k>t.

Therefore, there are two types of compatibility according to whether G is in a cycle, or else in a suitable position in a branch.

Figure 2A:
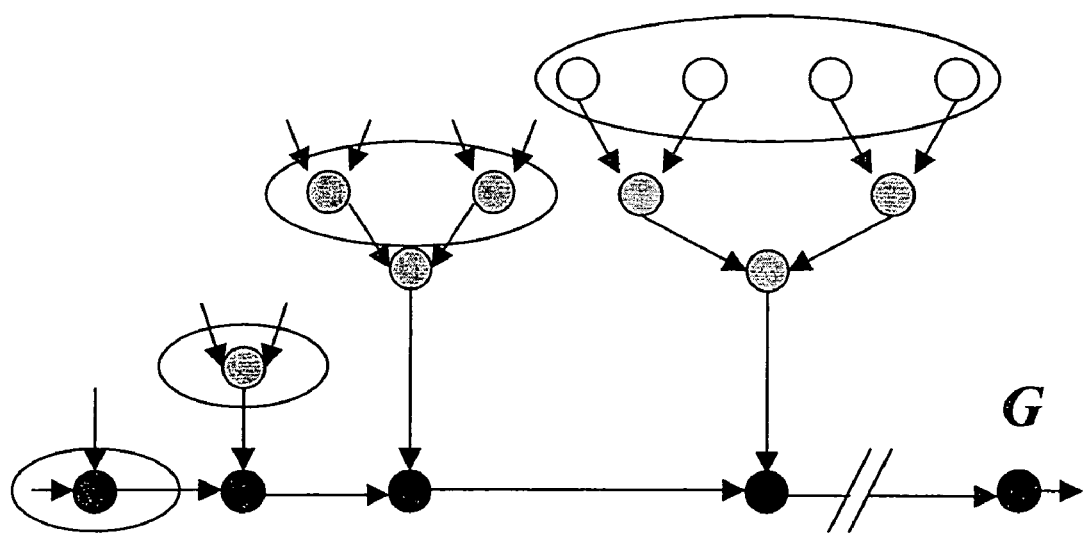

When G is in a cycle, i.e. u=0, regardless of the value of k, there is a solution of odd rank in the cycle and solutions of even rank disseminated in α=min(k, t) consecutive branches related to the cycle, i.e. $2^\alpha$ solutions in all. FIG. 2A illustrates this case with k≧t=3, i.e. a prime factor congruent to 9 (mod 16), which imposes that u=0.

Figure 2B:
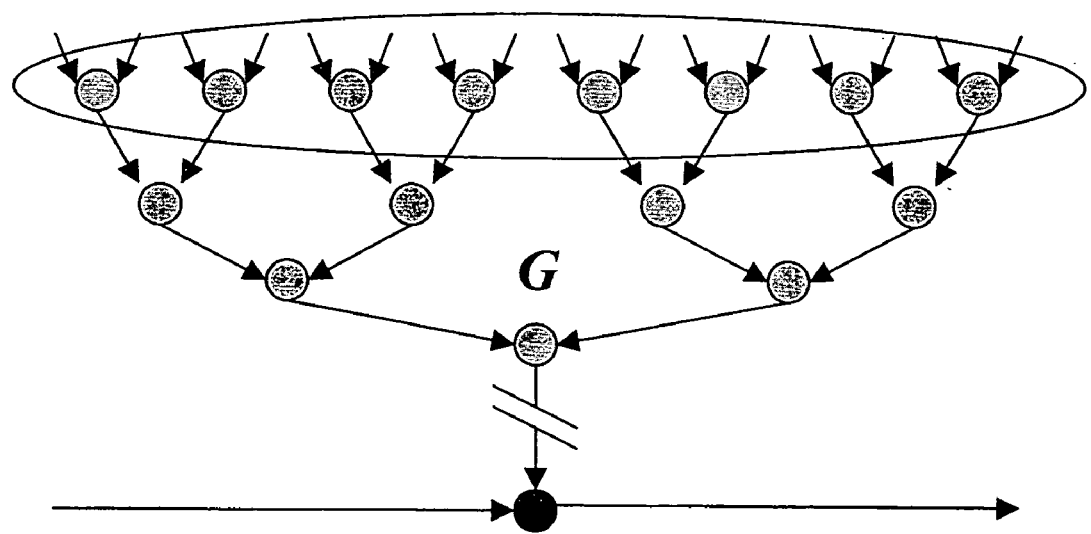

When G is in a suitable position in a branch, i.e. u>0 and u+k≦t, there are $2^k$ solutions, all of even rank and in the branch. FIG. 2B illustrates this case.

Given a parameter k, there are therefore two types of prime factors according to whether the value of t is less than k or else larger than or equal to k.

Figure 3A:
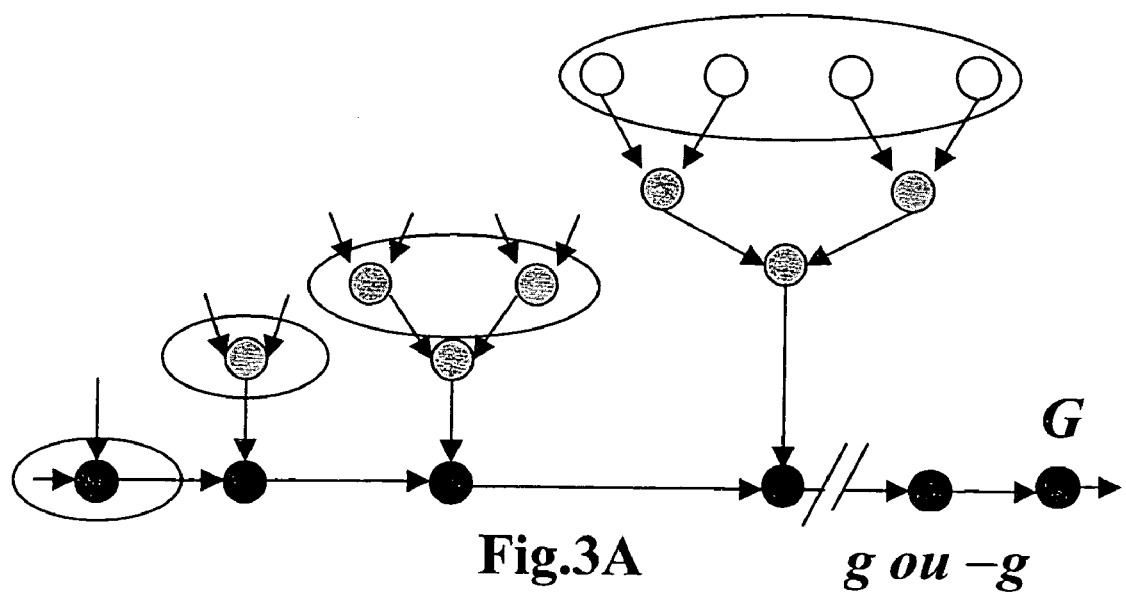

For any prime factor $p_j$, such as t<k, each $G_i$ should be in a cycle, and there is no solution in the branch related to $G_i$. Let us define a number $\Delta_{i,j}$ which is +1 or −1 according to whether $g_i$ or $-g_i$ is in the cycle. There is no choice for any of the m numbers $\Delta_{1,j}$ to $\Delta_{m,j}$. FIG. 3A illustrates a case with t<k: $G_i$ is in a cycle with a prime factor $p_j$ congruent to 9 (mod 16), i.e. u=0, t=3 with k>3.

Figure 3B:
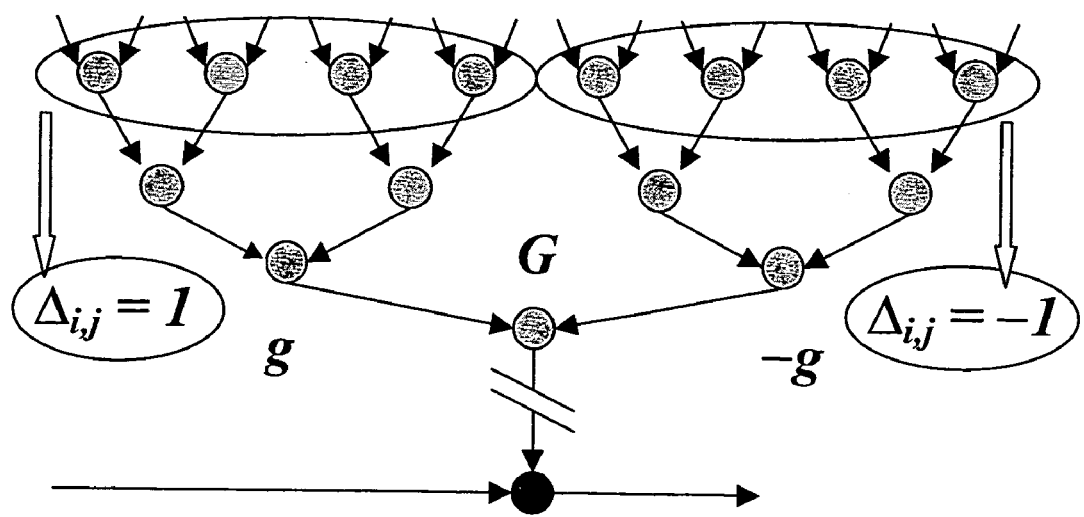

For any prime factor $p_j$ such that t≧k, each $G_i$ should be such that u+k≦t, i.e., either in a cycle with u=0 or else, in a suitable position in a branch with 1≦u≦t−k. Let us define a number $\Delta_{i,j}$ which is +1 or −1 according to whether $Q_{i,j}$ is in the portion of the graph related to $g_i$ or to $-g_i$. There is a choice for each of the m numbers $\Delta_{1,j}$ to $\Delta_{m,j}$; each number $\Delta_{i,j}$ may individually be switched from one value to the other. FIG. 3B illustrates a case when t≧k: $G_i$ is in a branch with a prime factor $p_j$ congruent to 17 (mod 32), i.e., u=1, t=4 with k=3.

Each set of f components $\{\Delta_{i,j} \ldots \Delta_{i,f}\}$ is a square root of unity in $CG(p_j)$. This root is trivial or not according to whether the f components are equal or not; we then state that the set of f components is constant or variable, which expresses the fact that the number $q_i$ is either trivial or not. Therefore, when a number $q_i$ is non-trivial, the set of f components $\{\Delta_{i,1} \ldots \Delta_{i,f}\}$ summarizes a factorization of the module. It is therefore possible to test the principles before calculating the private components $Q_{i,j}$.

When a public number $G_i$ is in a cycle for a prime factor $p_j$, the number $\Delta_{i,j}$ is +1 or −1, according to whether $g_i$ or $-g_i$ is in the cycle. When $p_j \equiv 3$ (mod 4), this is Legendre's symbol: $\Delta_{i,j}=(g_i|p_j)$ When a public number $G_i$ is in a suitable position in a branch for a prime factor $p_j$, the value to be given to $\Delta_{i,j}$ may be determined by computing the private component $Q_{i,j}$.

Production of sets of keys—Given a parameter k, there are two strategies.

Either the generator requires f prime factors in order to determine m base numbers. The first prime numbers: 2, 3, 5, 7, . . . are examined for evaluating their compatibility with each of the f large prime factors $p_1$ to $p_f$. Although g=2 is not compatible with p≡5 (mod 8), 2 may enter into the composition of a base number. Indeed, when two numbers are in a similar position in a branch, their product is closer to the cycle, exactly as a square brings the cycle closer. A base number may thereby be obtained by composing the numbers which are not appropriate individually.

Or the generator requires m base numbers and characteristics of the module such that a bit size (for example, 512, 768, 1024, 1536, 2048) and a number of bits successive to 1 with strong weights (for example, 1, 8, 16, 24, 32) in order to determine f>2 prime factors. Noted as $G_1, G_2, \ldots G_m$, the base numbers generally appear among the first prime numbers: 2, 3, 5, 7, 11 . . . or else these are combinations of the first prime numbers. Unless indicated otherwise, these are the first m prime numbers; $G_1=2, G_2=3, G_3=5, G_4=7, \ldots$ Let us note that p≡5 (mod 8), is not compatible with g=2. Module n will be the product of f prime factors with close sizes, i.e. the size assigned to the module divided by f.

First principle—The parameter k, each prime factor from $p_1$ to $p_f$ and each base number g from $g_1$ to $g_m$ should be compatible. Let us define a number h such as $2^h$ divides the rank of g with respect to p, whereas $2^{h+1}$ does not divide it. To compute the number h, the following procedure uses Legendre's symbol (g|p) and a number b, a primitive $2^t$th root of unity in CG(p).

If (g|p)=+1 with t=1, return "h=0".

If (g|p)=+1 with t>1, apply the key $<(p-1+2^t)/2^{t+1}$, p> to G in order to obtain a result called w.

If w=+g, return "h=0".

If w=p−g, return "h=1".

Else, set c to b and for i from t−1 to 2,

Apply key $<2^i$, p> to w|g (mod p) in order to obtain ±1,

If −1, set h to i and replace w with w×c (mod p),

Replace c with c2 (mod p).
Return "value of h from 2 to t−1".
If (g|p)=−1, return "h=t".

Let us recall that k, g and p are incompatible when u>0 with k+u>t; they are compatible when h=0 or 1, regardless of the value of k, and equally when k>1 with k+h≦t+1.

Second principle—The three following procedures correspond to different implementations of the second principle. In certain implementations, the second principle may be reinforced to the point of requiring that each number $q_1$ to $q_m$ be not trivial. The role of the base numbers is then balanced; balancing or not the second principle has an effect of certain aspects of the demonstration of the security of the scheme. Finally, when there are f>2 distinct prime factors, among the m numbers $\{q_1 \ldots q_m\}$, it may be required that there be at least one subset of f−1 independent numbers.

The three procedures use m×f numbers $\delta_{i,j}$ defined as follows.

When $p_j$ is such that t<k, for i from 1 to m, $\delta_{i,j}=\Delta_{i,j}$, i.e. +1 if $h_{i,j}=0$ and −1 if $h_{i,j}=1$.

When $p_j$ is such that t≧k, for i from 1 to m, $\delta_{i,j}=0$, which means that $\Delta_{1,j}$ to $\Delta_{m,j}$ may be selected according to the second principle.

A first procedure ascertains that at least one set $\{\delta_{i,1} \ldots \delta_{i,f}\}$ is variable or zero, i.e. that at least one number $q_1$ to $q_m$ is non-trivial or may be chosen as non-trivial.

For i from 1 to m and j from 1 to f,
if $\delta_{i,j}=0$ or $\neq \delta_{i,1}$, return "success".
Return "failure".

A second procedure ascertains that each set $\{\delta_{i,1} \ldots \delta_{i,f}\}$ is variable or zero, i.e. that each number $q_1$ to $q_m$ is non-trivial or may be chosen as non-trivial.

For i from 1 to m,
For j from 1 to f,
if $\delta_{i,j}=0$ or $\neq \delta_{i,1}$, skip to the next value of i,
Return "failure".
Return "success".

A third procedure ascertains that each pair of prime factors $p_{j1}$ and $p_{j2}$, with $1 \leq j_1 \leq j_2 \leq f$, there is at least one set $\{\delta_{i,1} \ldots \delta_{i,f}\}$ where $\delta_{i,j1}$ is zero or different from $\delta_{i,j2}$. It obviously fails when m is smaller than f−1. When it succeeds, among the m numbers $q_1$ to $q_m$, there is at least one set of independent f−1 numbers with respect to the f prime factors.

For $j_1$ from 1 to f−1 and for $j_2$ from $j_1+1$ to f,
For i from 1 to m,
If $\delta_{i,j1}=0$ or $\neq \delta_{i,j2}$, skip to the next values of $j_1$ and $j_2$,
Return "failure".
Return "success".

When a procedure fails, the generator of GQ2 key sets follows its strategy chosen from the two possible strategies:

Change one of the m base numbers while keeping the f prime factors,

Change one of the f prime factors while keeping the m base numbers.

Third principle—The following procedure determines whether the set of generalized GQ2 keys, either during production or already produced, is either a set of elementary GQ2 keys, i.e. that the 2×m numbers $\pm g_1$ to $\pm g_m$ are all non-quadratic residues, or else, a set of complementary GQ2 keys, i.e. that among the 2×m numbers $\pm g_1$ to $\pm g_m$, there is at least one quadratic residue.

The procedure uses both Legendre's symbols $(g_i|p_j)$ and $(-g_i|p_j)$ for i from 1 to m and for j from 1 to f.

For i from 1 to m,
For j from 1 to f,
If $(g_i|p_{js})=-1$, skip to the next value of i.
Return "set of complementary GQ2 keys".

For j from 1 to f,
If $(g_i|p_i)=-1$, skip to the next value of i.
Return "set of complementary GK2 keys".

Return "set of elementary GK2 keys".

Private components—For an equation of the direct type: $x^v \equiv g_i^2 \pmod{p_j}$ the following computation establishes all the possible values for the private component $Q_{i,j}$. The two simplest and most current cases, i.e. t=1 and t=2, are followed by the more complex case, i.e. t>2.

For t=1, i.e. $p_j \equiv 3 \pmod 4$, the key $<(p_j+1)/4, p_j>$ provides the quadratic square root of any quadratic residue in $CG(p_j)$. From this, a number is derived $s_j \equiv ((p_j+1)/4)^k \pmod{(p_j-1)/2}$, which gives a key $<s_j, p_j>$ transforming $G_i$ into $w \equiv G_i^{sj} \pmod{p_j}$. $Q_{i,j}$ is equal to w or $p_j$−w.

For t=2, i.e. $p_j \equiv 5 \pmod 8$, the key $<(p_j+3)/8, p_j>$ provides the square root of odd rank for any element of odd rank in $CG(p_j)$. From this, a number is derived $s_j \equiv ((p_j+3)18)^k \pmod{(p_j-1)/4}$, which gives a key $<s_j, p_j>$ transforming $G_i$ into $w \equiv G^{sj} \pmod{p_j}$. Let us note that $z \equiv 2^{(pj-1)/4} \pmod{p_j}$ is a square root of −1 because 2 is a non-quadratic residue in CG$(p_j)$. $Q_{i,j}$ is either equal to w or to $p_j$−w or else to w'≡w×z (mod $p_j$) or $p_j$−w'.

For $p_j 2^t+1 \pmod{2^{t+1}}$ with t>2, key $<(p_j-1+2^t)/2^{t+1}, p_j>$ provides the square root of odd rank of any element of odd rank. The compatibility test between k, g and p gave the value of h, next that of u.

When $G_i$ is in a cycle (u=0, regardless of the value of k), a number is established, $s_j \equiv ((p_j-1+2^t)/2^{t+l})^k \pmod{(p_j-1)/2^t}$. Key $<s_j, p_j>$ transforms $G_i$ into the solution of odd rank $w \equiv G_i^{sj} \pmod{p_j}$. There are solutions of even rank distributed in min(k, t) consecutive branches related to the cycle, let us say, in α branches. $Q_{i,j}$ is equal to the product of w by any of the $2^\alpha$th roots of unity in $CG(p_j)$.

When $G_j$ is in a suitable position in a branch (u>0, u+k≦t), all the solutions are in the same branch as $G_j$, a branch related to a cycle by the $2^u$th power of the number $G_i$. A number is established as $s_j \equiv ((p_j-1+2^t)/2^{t+1})_{k+u} \pmod{(p_j-1)/2^t}$.

Key $<s_j, p_j>$ transforms the $2^u$th power of $G_i$ into a number of odd rank w. The set of products of w with the primitive $2^{k+u}$th roots of unity in $CG(p_j)$ comprises the $2^k$ values of $Q_{i,j}$.

When $p_j$ is such that t≧k, as number $b_j$ is a primitive $2^t$th root of unity in $CG(p_j)$, the $2^{t-u}$th power of $b_j$ in $CG(p_j)$ exists; this is a primitive $2^k$th root of unity. The value of number $\Delta_{i,j}$ may be switched by multiplying $Q_{i,j}$ by a primitive $2^k$th root of unity.

For an equation of the inverse type: $1 \equiv x^v \times g_i^2 \pmod{p_j}$, it is sufficient to replace number $s_j$ with $((p_j-1)/2^t)-s_j$ in the key $<s_j, p_j>$, which amounts to inverting the value of $Q_{i,j}$ in $CG(p_j)$.

Example of a Set of Keys with Two Prime Factors Congruent to 5 (mod 8)

$p_1$=E6C83BF428689AF8C35E07EDD06F9B39A659829A-58B79CD89 4C435C95F32BF25

$p_2$=11BF8A68A0817BFCC00F15731C8B70CEF9204A34-133A0DEF8 62829B2EEA74873D n $p_1 \times p_2$=FFFF8263434F173D0F2E76B32D904F56F4A5A 6A50008C43D32B650E9AB9AAD2EB713CD4F9A97C4 DBDA3828A3954F296458D5F42C0126F5BD6B05478B EOA80ED1

Here are the Legendre symbols of the very first prime numbers.

$(2|p_1)$=−1; $(3|p_1)$=−1; $(5|p_1)$=+1; $(7|p_1)$=−1;

$(1|p_1)$=+1; $(13|p_1)$=−1; $(17|p_1)$=+1;

In $CG(p_1)$, the rank is odd for −5, −11 and 17.

$(2|p_2)$=−1; $(3|p_2)$=+1; $(5|p_2)$=+1; $(7|p_2)$=+1;

$(11|p_2)$=+1; $(13|p_2)$=−1; $(17|p_2)$=−1;

In $CG(p_2)$, the rank is odd for 3, −5, 7 and 11.

Carmichael's function is $\lambda(n)$=scm$((p_1-1)/4, (p_2-1)/4)$.

$\lambda(n)$=33331A13DA4304A5CFD617B6F8343116421215 43334F40C3D57A9C8558555D5BDAA2EF6AED17B9E 3794F51A65A1B37239B18FA9B0F618627D8C7E1D849 9C1B With k=9, the number $\sigma \equiv \lambda(n)-((1+\lambda(n))/2)^9$ (mod $\lambda(n)$) is used as a private exponent, in order to use the generic equations of the inverse type.

σ=01E66577BC997CAC273671E187A35EFD25373ABC9 FE6770E7446C0CCEF2C72AF6E89D0BE277CC6165F1 007187AC58028BD2416D4CC1121E7A7A8B6AE186BB 4B0

Numbers 2, 3, 7, 13 and 17 are not suitable as base numbers.

Key <σ,n> transforms $g_1$=5 into a private number $Q_1$ which does not shows any factorization. Indeed, in both fields, −5 is on a cycle.

$Q_1$=818C23AF3DE333FAECE88A71C4591A70553F91D6 C0DD5538EC0F2AAF909B5BDAD491FD8BF13F18E3 DA3774CCE19D0097BC4BD47C5D6EOE7EBF6D89FE 3DC5176C

Key <σ,n> transforms $g_2$=11 into a private number $Q_2$ which shows a factorization. Indeed, 11 is not in the same position in both fields.

$Q_2$=25F9AFDF177993BE8652CE6E2C728AF31B6D6615 4D3935AC535196B07C19080DC962E4E86ACF40D01F- DC454F2565454F290050DA052089EEC96A1B7DEB92- CCA7

Key <σ,n>transforms $g_3$=21=3×7 into a private number $Q_3$ which shows a factorization.

$Q_3$=78A8A2F30FEB4A5233BC05541AF7B684C2406415E A1DD67D18A0459A1254121E95D5CAD8A1FE3ECFE0 685C96CC7EE86167D99532B3A96B6BF9D93CAF8D4F 6AF0

Key <σ,n> transforms $g_4$=26=2×13 into a private number $Q_4$ which shows a factorization.

$Q_4$=6F1748A6280A200C38824CA34C939F97DD2941DA D300030E481B738C62BF8C673731514D1978AF5655FE 493D659514A6CE897AB76C01E50B5488C5DAD12332 E5

The private key may further be represented by both prime factors, the parameter of the Chinese remainders and eight private components. α≡$(p_2(\text{mod } p_1))^{-1}$(mod $p_1$)=ADE4E77 B703F5FDEAC5B9AAE825D649E06692D15FBFODF73 7B15DC4D012FD1D $Q_{1,1} \equiv Q_1$(mod $p_1$)=7751AEE918A8F5CE44AD73D613A 4F465E06C6F 9AF4D229949C74DD6C18D76FAF $Q_{1,2} \equiv Q_1$(mod $p_2$)=A9EB5FA1B2A981AA64CF88C382923 DB64376F 5FD48152C08EEB6114F31B7665F $Q_{2,1} \equiv Q_2$(mod $p_1$)=D5A7D33C5FB75A033F2FOE8B2027 4B957FA3 4004ABB2C2AC1CA3F5320C5A9049

$Q_{2,2} \equiv Q_2$(mod $p_2$)=76C9F5EFD066C73A2B5CE9758 DB51 2DFC011 F5B5AF7DA8D39A961CC876F2DD8F $Q_{3,1} \equiv Q_3$(mod $p_1$)=2FEC0DC2DCA5BA7290B27BC8CC 85C938A514 B8F5CFD55820A174FB5E6DF7B883

$Q_{3,2} \equiv Q_3$(mod $p_2$)=010D488E6BOA38A1CC406CEE0D55 E59 013389D8549DE493413F34604A160C1369

$Q_{4,2} \equiv Q_4$(mod $p_1$)=A2B32026B6F82B6959566FADD9517 DB8ED852 4652145EE159DF3DCOC61FE3617

$Q_{4,2} \equiv Q_4$(mod $p_2$)=011A3BB9B607F0BD71BBE25F5 2B30 5C22489 9E5F1F8CDC2FE0D8F 9FF62B3C9860F Polymorphism of the private key GQ2—The different possible representations of the private key GQ2 prove to be equivalent: they all amount to knowing the factorization of the module n which is the actual GK2 private key. The representation of the GQ2 private key has an effect on the progress of the computations within the demonstrating entity hut not within the controlling entity. Here are the three main representations which are possible for the GQ2 private key. 1) The conventional representation of GQ private keys consists in storing m private numbers $Q_i$ and the public checking key <v, n>; for the GQ2 schemes, this representation is in competition with the following two. 2) The optimum representation in terms of work loads consists in storing the parameter k, the f prime factors $p_j$, the m×f private components $Q_{i,j}$ and the f−1 parameters of the Chinese remainders. 3) The optimum representation in terms of private key size consists in storing the parameter k, the m base numbers $g_i$ and the f prime factors $p_j$, and then in starting each use by establishing either m private numbers $Q_i$ and the module n so that it amounts to the first representation, or m×f private components $Q_{i,j}$ and the f−1 parameters of the Chinese remainders so that it amounts to the second representation.

Because the security of the dynamic authentication mechanism or of the digital signature is equivalent to knowing a factorization of the module, with the GQ2 schemes, it is not possible to distinguish two entities using the same module simply. Generally, each proving entity has its own GQ2 module. However, GQ2 modules with four prime factors may be specified, two of which are known to an entity and the other two to another one.

Dynamic authentication—The dynamic authentication mechanism is for proving to an entity called a controller, the authenticity of another entity called a demonstrator as well as the authenticity of a possible associated message M, so that the controller ascertains that it is actually dealing with the demonstrator and optionally that itself and the demonstrator are speaking of the same message M. The associated message M is optional, which means it may be empty.

The dynamic authentication mechanism is a sequence of four acts: an engagement act, a challenge act, a response act and a checking act. The demonstrator plays the engagement and response acts. The controller plays the challenge and checking acts.

Within the demonstrator, a witness may be isolated, in order to isolate the most sensitive parameters and functions of the demonstrator, i.e. the production of commitments and responses. The witness has the parameter k and the GQ2 private key, i.e. the factorization of the module n according to one of the three representations mentioned above: • the f prime factors and the m base numbers, • the m×f private components, the f prime factors and the f−1 parameters of the Chinese remainders, • the m private numbers and the module n.

The witness may correspond to a particular embodiment, for example • a chip card connected to a PC forming together the demonstrator or even • programs particularly protected within a PC or even • programs particularly protected within a chip card. The thereby isolated witness is similar to the witness defined hereafter within the signing entity. Upon each execution of the mechanism, the witness produces one or more commitments R, and then as many responses D to as many challenges d. Each set {R, d, D} forms a GQ2 triplet.

In addition to it comprising the witness, the demonstrator also has a hashing function and a message M, if necessary.

The controller has the module n, for example, from a directory of public keys or even from a certificate of public keys; if necessary, it also has the same hashing function and a message M'. The GQ2 public parameters, i.e. numbers k, m and $g_1$ to $g_m$ may be provided to the controller by the demonstrator. The controller is able to reconstruct a commitment R' from any challenge d and from any response D. Parameters k and m inform the controller. Unless indicated otherwise, the m base numbers from $g_1$ to $g_m$ are the first m prime numbers. Each challenge $d_i$ should include m elementary challenges referenced from $d_l$ to $d_m$: one per base number. Each elementary challenge from $d_l$ to $d_m$ is a number from 0 to $2^{k-1}-1$ (numbers from v/2 to v−1 are not used). Typically, each challenge is coded by m times k−1 bits (and not m times k bits). For example, with k=5 and m=4 base numbers, 5, 11, 21 and 26, each challenge includes 16 bits transmitted on four quartets. When the possible (k−1)×m challenges are equally probable, the number (k−1)×m determines the security brought by each GQ2 triplet: an impostor who by definition, does not know the factorization of the module n, has one chance of success out of $2^{(k-1)\times m}$, exactly. When $^{(k-1)}$1)×m is from 15 to 20, one triplet is sufficient for reasonably ensuring dynamic authentication. In order to achieve any level of security, triplets may be produced in parallel; they may also be produced in sequence, i.e. repeat the execution of the mechanism.

1) The act of commitment comprises the following operations.

When the witness does not use the Chinese remainders, it has the parameter k, the m private numbers from $Q_1$ to $Q_m$ and module n; it randomly and privately picks one or more random numbers r (0<r<n); and then by successively squaring them k times (mod n), it transforms each random number r into a commitment R.

$$R \equiv r^v (\mod n)$$

Here is an example with the previous set of keys without the Chinese remainders.

r=5E94B894AC24AF843131F437C1B1797EF562CFA53A B8AD426C1AC016F1C89CFDA13120719477C3E2FB4B 4566088E10EF9C010E8F09C60D9815121981260911996

R6BBF9FFA5D509778D0F93AE074D36A07D95FFC38 F 70C8D7E3300EBF234FA0BC20A95152A8FB73DE81FA EE5BF4FD3EB7F5EE3E36D7068D083EF7C93F6FDDF7 3A

When the witness uses the Chinese remainders, it has the parameter k, the first f prime factors from $p_1$ to $p_f$, f−1 parameters of Chinese remainders and m×f private components $Q_{i,j}$; it randomly and privately picks one or more collections of f random numbers: every collection includes one random number $r_i$ per prime factor $p_i$ (0<$r_i$<$p_i$); and then by successively squaring it k times (mod $p_i$), it transforms each random number $r_i$ into a commitment component $R_i$.

$$R_i \equiv r_i^V (\mod p_i)$$

For each collection of f commitment components, the witness establishes a commitment according to the Chinese remainder technique. There are as many commitments as there are random number collections R=Chinese remainders($R_1$, $R_2$, . . . $R_f$)

Here is an example with the previous set of keys and with the Chinese remainders.

$r_1$=5C6D37F0E97083C8D120719475E080BBBF9F7392F1 1F3E2 44FDF0204E84D8CAE $R_1$=3DDF516EE3945CB86D20D9C49E0DA4D422811D0 7A7607 4DD4FE20C5C7C5E205DF66

$r_2$=AC8F85034AC78112071947C457225E908E83A2621B 0154 ED15DBFCB9A4915AC3

$R_2$=01168CEC0F661EAA15157C2C287C6A5B34EE28F8 EB4D8D 340858079BCAE4ECB016

R=Chinese remainders ($R_1$,$R_2$)=0AE51D90CB4FDC3DC5 7C56E063C9ED86BE153B71FC65F47C123C27F082BC3 DD15273D4A923804718573F2F05E991487D17DAE0AA B7DF0D0FFA23E0FE59F95F0

In both cases, the demonstrator transmits to the controller, either all or part of each commitment R, or else a hashing code H obtained by hashing each commitment R and a message M.

2) The act of challenge consists in randomly picking one or more challenges d, each consisting of m elementary challenges $d_1$, $d_2$, . . . $d_m$; each elementary challenge $d_i$ is one of the numbers from 0 to v/2−1.

d=$d_1 d_2$ . . . $d_m$

Here is a challenge for both examples, i.e. with k=5 and m=4.

$d_1$=1011=11='B'; $d_2$=0011=3; $d_3$=0110=6; $d_4$=1001=9, d=$d_1$‖$d_2$‖$d_3$‖$d_4$=1011001101101001=B369

The controller transmits each challenge d to the demonstrator.

3) The act of response includes the following operations.

When the witness does not use Chinese remainders, it has the parameter k, the m private numbers from $Q_1$ to $Q_m$ and the module n; it computes one or more responses D by using each random number r from the commitment act and the private numbers according to the elementary challenges.

$$D \equiv r_i \times Q_i^{d_1} \times Q_2^{d_2} \times \ldots Q_m^{d_m} (\mod p_i)$$

Here is the continuation of the example without Chinese remainders.

D=027E6E808425BF2B401FD00B15B642B1A8453BE80 70D86C0A7870E6C1940F7A6996C2D871EBE61181253 2AC5875E0E116CC8BA648FD8E86BE0B2ABCC3CCB BBE4

When the witness uses Chinese remainders, it has the parameter k, f prime factors from $p_1$ to $p_f$, the f−1 Chinese remainder parameters and m×f private components $Q_{i,j}$; it computes one or more collections of f response components by using each collection of random numbers from the commitment act: each collection of response components includes one component per prime factor.

$$D = r \times Q_{1,i}^{d_1} \times Q_{2,i}^{d_2} \times \ldots Q_{m,i}^{d_m} \pmod{p_i}$$

For each collection of response components, the witness establishes a response according to the Chinese remainder technique. There are as many responses as there are challenges.

D=Chinese remainders($D_1, D_2, \ldots D_f$)

Here is the continuation of the example without the Chinese remainders.

$$D1 = r_i \times Q_{1,1}^{d_1} \times Q_{2,1}^{d_2} \times Q_{3,1}^{d_3} \times Q_{4,1}^{d_4} \pmod{p_1}$$

C71F86F6FD8F955E2EE434BFA7706E38E5E715375BC2 CD2029A4BD572A9EDEE6

$$D2 = r_2 \times Q_{1,2d1} \times Q_{2,2}^{d_2} \times Q_{3,2}^{d_3} \times Q_{4,2}^{d_4} \pmod{p_2}$$

0BE022F4A20523F98E9F5 DBEC0E10887902F3AA48C864A6C354 693AD0B59D85E

90CE7EA43CB8EA89ABDD0C814FB72ADE74F02FE6F 098ABB98C8577A660B9CFCEAECB93BE1BCC356811 BF12DD667E2270134C9073B9418CA5EBF5191218D3F DB3

In both cases, the demonstrator transmits each response D to the controller.

4) The act of checking consists in checking that each triplet {R, d, D} satisfies an equation of the following type for a non-zero value,

R×

$$\prod_{i=1}^{m} G_i^{d_i}$$

$\equiv D^{2^k} \pmod{n}$ or else R≡D×

$$\prod_{i=1}^{m} G_i^{d_i}$$

(mod n)

or, in restoring each commitment: none of them must be zero

R'≡$D^{2^k}$/

$$\prod_{i=1}^{m} G_i^{d_i}$$

(mod n) or else R'≡$D^{2^k}$×

$$\prod_{i=1}^{m} G_i^{d_i}$$

(mod n)

Optionally, the controller then computes a hashing code H' by hashing each restored commitment R' and the message M'. Dynamic authentication is successful when the controller thus retrieves what it has received at the end of the commitment act, i.e., all or part of each commitment R, or the hashing code H.

For example, a sequence of elementary operations transforms response D into a commitment R'. The sequence comprises k squares (mod n) separated by k−1 divisions or multiplications (mode n) by base numbers. For the i-th division or multiplication, which is performed between the i-th square and the i+1-th square, the i-th bit of the elementary challenge $d_1$, indicates if $g_1$ must be used, the i-th bit of the elementary challenge $d_2$ indicates if $g_2$ must be used, . . . up to the i-th bit of the elementary $d_m$ which indicates if $g_m$ must be used.

Here is the end of the example without the Chinese remainders.

D=027E6E808425BF2B401FD00B15B642B1A8453BE80 70D86C0A7870E6C1940F7A6996C2D871EBE61181253 2AC5875E0E116CC8BA648FD8E86BE0B2ABCC3CCBB BE4

Take the square modulo n: 88BA681DD641D37D7A7 D98 18D0DBEA82174073997C6C32F7FCAB30380C4C6229 B0706D1AF6EBD84617771C31B4243C2F0376CAF 5DE 644F098FAF3B1EB49B39

Multiply by 5 times 26=130, i.e. '82' modulo n: 6ECABA6 A91C22431C413E4EC7C7B39FDE14C9782C94FD6FA3 CAAD7AFE192B9440C1113CB8DBC45619595D263C10 67D3D0A840FDE008B415028AB3520A6AD49D Take the square modulo n: 0236D25049A5217B13818 B39AFB009E4D7D52B17486EBF844D64CF75C4F65203 1041328B29EBF0829D54E3BD17DAD218174A01E6E3 A650C6FD62CC274426607

Multiply by 21, i.e. '15' modulo n: 2E7F40960A8BBF 1899A06BBB6970CFC5B47C88E8F115B5DA594504A9 2834BA405559256A705ABAB6E7F6AE82F4F33BF9E9 12 27F0ACFA4A052C91ABF389725E93

Take the square modulo n: B802171179648AD 7E672D3A32640E2493BA2E82D5DC87DBA2B2CC032 5E7A71C50E8AE02E299EF868DD3FB916EBCBC0C55 69B53D42DAD49C956D8572E1285B0

Multiply by 5 times 11 times 21=1155, i.e. '483' modulo n: 3305560276310DEFEC1337EB5BB5810336FDB28E91 350D485B09188E0C4F1D67E68E9590DB7F9F39C22BD B45330136250111 248A8DC417C667B419D27CB11F72

Take the square modulo n: 8871C494081ABD1AEB865 6C38B9BAAB57DBA72A4BD4EF9029ECBFFF540E551 38C9F22923963151FD0753145DF70CE22E9D01999041 DB6104005EEB7B1170559

Multiply by 5 times 11 times 26=1430, i.e. '596' modulo n: 2CF5F76EEBF128A0701B56F837FF68F81A6A5D175 DAD67A14DAEC6FB68C362B1DC0ADD6CFC00FF5E EACDF794563BB09A17045ECFFF88F5136C7FBC825B C50C Take the square modulo n: 6BBF9FFA5D509778D0F9 3AE074D36A07D95FFC38F70C8D7E3300EBF234FA0B C20A95152A8FB73DE81FAEE5BF4FD3EB7F5EE3E3 6D7068D083EF7C93F6FDDF673A The commitment r is retrieved. Authentication is successful.

Here is the end of the example with the Chinese remainders.

D=90CE7EA43CB8EA89ABDD0C814FB72ADE74F02FE
6F098ABB98C 8577A660B9CFCEAECB93BE1BCC3568
11BF12DD667E2270134C9073B9418CA5EBF5191218D
3 FDB3

Take the square modulo n 770192532E9CED554A8
690B88F16D013010C903172B266C1133B136EBE3E B5F
13B170DD41F4ABE14736ADD3A70DFA43121 B6FC55
60CDD4B4845395763C792A68

Multiply by 5 times 26=130, i.e. '82' modulo n: 6EE9
BEF9E52713004971ABB9 FBC31145318E2A703C8A2F
B3E144E7786397CD8D1910E70FA86262DB771AD15 65
303 AD6E4CC6E 90AE3646B461D3521420E240FD4

Take the square modulo n: D9840D9A8E80002C4D03
29FF97D7AD163D8FA98F6AF8FE2B2160B2126CBBD
FC734E39F2C9A39983A426486BC477F20ED2CA5 9E66
4C23CA0E04E84F2F0AD65340

Multiply by 21, i.e. '15' modulo n: D7DD7516383F7
8944F2C90116E1BEE0CCDC8D7CEC5D7D1795ED33B
FE8623DB3D2E5B6C5F62A56A2DF4845A94F32BF3C
AC360C7782B5941924BB4BE91F86BD85F Take the square modulo n: DD34020DD0804C0757F2 9
A0CBBD7B46A1BAF949214F74FDFE021B626ADAFB
AB5C3F1602095DA39D70270938AE362F2DAE0B9148
55310C75BCA328A4B2643DCCDF Multiply by 5 times 11 times 21=1155, i.e. '483' modulo
n: 038EF55B4C826D189C6A48EFDD9DADBD2B63A
7D675A0587C8559618EA2D83DF552D24EAF6BE983F
B4AFB3DE7D4D2545190F1B1F946D327A4E9CA2
58C73A98F57

Take the square modulo n: D1232F50E30BC6B7365C C
2712E5CAE079E47B971DA03185B33E918EE6E99252D
B3573CC87C604B327E5B20C7AB920FDF142A8909DB
BA1C04A6227FF18241C9FE Multiply by 5 times 11 times 26=1430, i.e. '596' modulo
n:
3CC768F12AEDFCD4662892B9174A21D1F0DD9127A5
4AB63C 984019BED9BF88247EF4CCB56D71E0FA30CF
0FF28B7CE45556F744C1FD751BFBCA040DC9CBAB7
44

Take the square modulo n: 0AE51D90CB4FDC3DC757C
56E063C9ED86BE153B71FC65F47C1 23C27F 082BC 3D
D15273D4A923804718573F2F05E991487D17DAE0AAB
7DF0D0FFA23E0FE59F95F0

The commitment r is retrieved correctly. Authentication is successful.

Digital Signature

The digital signing mechanism enables an entity called a signing entity to produce signed messages and an entity called controller to ascertain signed messages. Message M is any binary sequence: it may be empty. The message M is signed by adding a signature appendix to it, which comprises one or more commitments and/or challenges, as well as the corresponding responses.

The controller has the module n, for example, from a directory of public keys or even from a certificate of public keys; it also has the same hashing function. The GQ2 public parameters, i.e. numbers k, m and $g_1$ to $g_m$ may be given to the controller by the demonstrator, for example by putting them in the signature appendix.

Numbers k and m inform the controller. Each elementary challenge from $d_1$ to $d_m$, on the one hand is a number from 0 to $2^{k-1}-1$ (numbers v/2 to v−1 are not used). Each challenge d on the other hand should include m elementary challenges referenced from $d_1$ to $d_m$, as many as there are base numbers. Further, unless indicated otherwise, the m base numbers, from $g_1$ to $g_m$ are the first m prime numbers. With (k−1)×m being from 15 to 20, it is possible to sign with four GQ2 triplets produced in parallel; with (k−1)×m being 60 or more, it is possible to sign with only one GQ2 triplet. For example, with k=9 and m=8, only one GQ2 triplet is sufficient; each challenge includes eight bytes and the base numbers are 2, 3, 5, 7, 11, 13, 17 and 19.

The signing operation is a sequence of three acts: a commitment act, a challenge act and a response act. Each act produces one or more GQ2 triplets each comprising: a commitment r (≠0), a challenge d consisting of m elementary challenges referenced by $d_1$, $d_2$, . . . $d_m$ and a response D (≠0).

The signing entity has a hashing function, the parameter k and the GQ2 private key, i.e., the factorization of the module n according to one of the three representations mentioned above. Within the signing entity, it is possible to isolate a witness which executes the commitment and response acts in order to isolate the most sensitive functions and parameters of the demonstrator. In order to compute commitments and responses, the witness has the parameter k and the GQ2 private key, i.e., the factorization of the module n according to one the three representations mentioned above. The thereby isolated witness is similar to the witness defined within the demonstrator. it may correspond to a particular embodiment, for example, • a chip card connected to a PC forming together the signing entity or even • programs particularly protected within a PC, or even, • programs particularly protected within a chip card.

1) The act of commitment comprises the following operations.

When the witness has the m private numbers $Q_1$ to $Q_m$ and the module n, it randomly and privately picks one or more random numbers r (0<r<n); and then, by k successive squarings (mode n), it transforms each random number r into a commitment R.

$$R \equiv r^v \pmod{n}$$

When the witness has f prime factors from $p_1$ to $p_f$ and m×f private components $Q_{i,j}$, it randomly and privately picks one or more collections of f random numbers: each collection includes a random number $r_i$ per prime factor $p_i$ (0<$r_i$<$p_1$); and then k successive squarings (mod $p_i$), it transforms each random number $r_i$ into a commitment component $R_i$, $$R_i \equiv r_i^v \pmod{p_i}$$

For each collection of f commitment components, the witness establishes a commitment according to the Chinese remainder technique. There are as many commitments as there are random number collections.

$$r = \text{Chinese remainders}(R_1, R_2, \ldots R_f)$$

2) The act of challenge consists in hashing all commitments r and the message m to be signed in order to obtain a hashing code from which the signing entity forms one or more challenges each comprising m elementary challenges; each elementary challenge is a number from 0 to v/2−1; for example, with k=9 and m=8, each challenge includes eight bytes. There are as many challenges as there are commitments. d=$d_1$, $d_2$, . . . $d_m$, extracted from the Hash(M, R) result 3) The act of response includes the following operations.

When the witness has m private numbers $Q_1$, to $Q_m$, and module n, it calculates one or more responses D by using each random number r of the commitment act and the private numbers according to the elementary challenges.

$$X \equiv Q_1^{d_1} \times Q_2^{d_2} \times \ldots Q_m^{d_m} \pmod{n}$$

$$D \equiv r \times X \pmod{n}$$

When the witness has f prime factors from $p_1$ to $p_f$ and m×f prime components $Q_{i,j}$, it calculates one or more collections of f response components by using each collection of random numbers from the commitment act; each collection of response components includes one component per prime factor $$x \equiv Q_{1,i}^{d1} \times Q_{2,i}^{d2} \times \ldots Q_{m,i}^{dm} (\mod p_i)$$

$$D_i \equiv r_i \times X_i (\mod p_i)$$

For each collection of response components, the witness establishes a response according to the Chinese remainder technique. There are as many responses as there are challenges.

D=Chinese remainders $(D_1, D_2, \ldots D_f)$

The signing entity signs the message M by adding a signature appendix comprising:

either each GQ2 triplet, i.e., each commitment R, each challenge d and each response D, or each commitment R and each corresponding response D, or each challenge d and each corresponding response D.

The running of the verification operation depends on the contents of the signature appendix. Three cases are distinguished.

Should the appendix comprises one or more triplets, the checking operation includes two independent processes for which chronology is indifferent. The controller accepts the signed message if and only if, both following conditions are satisfied.

Firstly, each triplet must be consistent (an appropriate relationship of the following type has to be verified) and acceptable (the comparison has to be done on a non-zero

R×

$$\prod_{i=1}^{m} G_i^{d_i}$$

$$\equiv D^{2^k}(\mod n) \text{ or else } R \equiv D^{2^k} \times$$

$$\prod_{i=1}^{m} G_i^{d_i}$$

(mod n)

For example, the response D is converted by a sequence of elementary operations: k squares (mod n) separated by k−1 multiplication or division operations (mod n) by base numbers. For the i-th multiplication or division which is performed between the i-th square and the i+1st square, the i-th bit of the elementary challenge $d_1$ indicates whether it is necessary to use $g_1$, the i-th bit of the elementary challenge $d_2$ indicates whether it is necessary to use $g_2$, . . . Up to the i-th bit of the elementary challenge $d_m$ which indicates if it is necessary to use $g_m$. It is thus necessary to retrieve each commitment R present in the signature appendix.

Furthermore, the triplet or triplets must be linked to the message M. By hashing all the commitments R and the message M, a hashing code is obtained from which each challenge d must be recovered.

$d=d_1 d_2 \ldots d_m$, identical to those extracted from the result Hash(M, R).

If the appendix has no challenge, the checking operation starts with the reconstitution of one or more challenges d' by hashing all the commitments R and the message M.

$d=d'_1 d'_2 \ldots d'_m$, extracted from the result Hash(M, R).

Then, the controller accepts the signed message if and only if each triplet is consistent (an appropriate relationship of the following type is verified) and acceptable (the comparison is done on a non-zero value).

R×

$$\prod_{i=1}^{m} G_i^{d'_i}$$

$$\equiv D^{2^k}(\mod n) \text{ or else } R \equiv D^{2^k} \times$$

$$\prod_{i=1}^{m} G_i^{d'_i}$$

(mod n)

Should the appendix comprise no commitment, the checking operation starts with the reconstitution of one or more commitments R' according to one of the following two formulae, namely the one that is appropriate. No re-established commitment should be zero.

$$R' \equiv D^{2^k} /$$

$$\prod_{i=1}^{m} G_i^{d_i}$$

(mod n) or else $R' \equiv D_2^k \times$ $$\prod_{i=1}^{m} G_i^{d_i}$$

(mod n)

Then, the controller must hash all the commitments R' and the message M so as to reconstitute each challenge d.

$d=d_1 d_2 \ldots d_m$, identical to those extracted from the result Hash (M, R').

The controller accepts the signed message if and only if each reconstituted challenge is identical to the corresponding challenge in the appendix.

The invention claimed is:

1. A computer-implemented process comprising:

obtaining a set of one or more private values $Q_1, Q_2, \ldots, Q_m$ and respective public values $G_1, G_2, \ldots, G_m$, each pair of keys $(Q_i, G_i)$ verifying either the equation $G_i \cdot Q_i^v \equiv 1 \mod n$ or the equation $G_i \equiv Q_i^v \mod n$, wherein m is an integer greater than or equal to 1, i is an integer between 1 and m, and wherein n is a public integer equal to the product of f private prime factors designated by $p_i, \ldots, p_f$, at least two of these prime factors being different from each other, wherein f is an integer greater than 1, and wherein v is a public exponent such that $v=2^k$, wherein k is a security parameter having an integer value greater than 1, and wherein each public value $G_i$ (for i=1, . . . ,m) is such that $G_i \equiv g_i^2$ mod n, wherein $g_i$ (for i=1, . . . ,m) is a base number having an integer value greater than 1 and smaller than each of the prime factors $p_1, \ldots, p_f$, and wherein, for at least one integer value l between 1 and m, $g_l$ or $(-g_l)$ is a quadratic residue of the body of integers modulo n, and wherein, for at least one integer value s between 1 and m, $q_s$ is neither congruent to $g_s$ mod n nor congruent to $(-g_s)$ mod n, wherein, for i=1, . . . ,m, $q_i \equiv Q_i^{-v/2}$ mod n in the case $G_i \times Q_i^v = 1$ mod n and $q_i = Q_i^{v/2}$ mod n in the case $G_i = Q_i^v$ mod n; and using at least the private values $Q_1, Q_2, \ldots, Q_m$ in an authentication or in a signature method.

2. The computer-implemented process according to claim 1, further comprising:

receiving a commitment R from a demonstrator, the commitment R having a value computed such that: $R = r^v$ mod n, wherein r is an integer such that $0 < r < n$ randomly chosen by the demonstrator;

selecting m challenges $d_1, d_2, \ldots, d_m$ randomly;

sending the challenges $d_1, d_2, \ldots, d_m$ to the demonstrator;

receiving a response D from the demonstrator, the response D having a value computed such that: $D = r \times Q_1^{d_1} \times Q_2^{d_2} \times \ldots \times Q_m^{d_m}$ mod n; and determining that the demonstrator is authentic if the response D has a value such that: $D^v \times G_1^{\epsilon_1 d_1} \times G_2^{\epsilon_2 d_2} \times \ldots \times G_m^{\epsilon_m d_m}$ mod n is equal to the commitment R, wherein, for i=1, . . . ,m, $\epsilon_i = +1$ in the case $G_i \times Q_i^v = 1$ mod n and $\epsilon_i = -1$ in the case $G_i = Q_i^v$ mod n.

3. The computer-implemented process according to claim 1, further comprising:

receiving a commitment R from a demonstrator, the commitment R having a value computed using the Chinese remainder method from a set of commitment components $R_j$ wherein j=1, . . . ,f, each commitment component $R_j$ having a value such that $R_j = r_j^v$ mod $p_j$, wherein $r_j$ is an integer such that $0 < r_j < p_j$ randomly chosen by the demonstrator;

selecting m challenges $d_1, d_2, \ldots, d_m$ randomly;

sending the challenges $d_1, d_2, \ldots, d_m$ to the demonstrator;

receiving a response D from the demonstrator, the response D being computed from a set of response components $D_j$ using the Chinese remainder method, the response components $D_j$ having a value such that: $D_j = r_j \times Q_{1,j}^{d_1} \times Q_{2,j}^{d_2} \times \ldots \times Q_{m,j}^{d_m}$ mod $p_j$ for j=1, . . . ,f, wherein $Q_{i,j} = Q_i$ mod $p_j$ for i=1, . . . ,m and j=1, . . . ,f; and determining that the demonstrator is authentic if the response D has a value such that: $D^v \times G_1^{\epsilon_1 d_1} \times G_2^{\epsilon_2 d_2} \times \ldots \times G_m^{\epsilon_m d_m}$ mod n is equal to the commitment R, wherein, for i=1, . . . ,m, $\epsilon_i = +1$ in the case $G_i \times Q_i^v = 1$ mod n and $\epsilon_i = -1$ in the case $G_i = Q_i^v$ mod n.

4. The computer-implemented process according to claim 1, further comprising:

receiving a token T from a demonstrator, the token T having a value such that T=h(M,R), wherein h is a function of two integers which makes use of a hash function, M is a message received from the demonstrator, and R is a commitment having a value computed such that: $R = r^v$ mod n, wherein r is an integer such that $0 < r < n$ randomly chosen by the demonstrator;

selecting m challenges $d_1, d_2, \ldots, d_m$ randomly;

sending the challenges $d_1, d_2, \ldots, d_m$ to the demonstrator;

receiving a response D from the demonstrator, the response D having a value such that: $D = r \times Q_1^{d_1} \times Q_2^{d_2} \times \ldots \times Q_m^{d_m}$ mod n; and determining that the message M is authentic if the response D has a value such that: $h(M, D^v \times G_1^{\epsilon_1 d_1} \times G_2^{\epsilon_2 d_2} \times \ldots \times G_m^{\epsilon_m d_m}$ mod n) is equal to the token T, wherein, for i=1, . . . ,m, $\epsilon_i = +1$ in the case $G_i \times Q_i^v = 1$ mod n and $\epsilon_i = -1$ in the case $G_i = Q_i^v$ mod n.

5. The computer-implemented process according to claim 1, further comprising:

receiving a token T from a demonstrator, the token T having a value such that T=h(M,R), wherein h is a function of two integers which makes use of a hash function, M is a message received from the demonstrator, and R is a commitment having a value computed using the Chinese remainder method from a set of commitment components $R_j$ wherein j=1, . . . ,f, each commitment component $R_j$ having a value such that $R_j \times r_j^v$ mod $p_j$, wherein $r_j$ is an integer such that $0 < r_j < p_j$ randomly chosen by the demonstrator;

selecting m challenges $d_1, d_2, \ldots, d_m$ randomly;

sending the challenges $d_1, d_2, \ldots, d_m$ to the demonstrator;

receiving a response D from the demonstrator, the response D being computed from a set of response components $D_j$ using the Chinese remainder method, the response components $D_j$ having a value such that: $D_j = r_j \times Q_{1,j}^{d_1} \times Q_{2,j}^{d_2} \times \ldots \times Q_{m,j}^{d_m}$ mod $p_j$ for j=1, . . . ,f, wherein $Q_{i,j} = Q_i$ mod $p_j$ for i=1, . . . ,m and j=1, . . . ,f; and determining that the message M is authentic if the response D has a value such that: $h(M, D^v \times G_1^{\epsilon_1 d_1} \times G_2^{\epsilon_2 d_2} \times \ldots \times G_m^{\epsilon_m d_m}$ mod n) is equal to the token T, wherein, for i=1, . . . ,m, $\epsilon_i = +1$ in the case $G_i \times Q_i^v = 1$ mod n and $\epsilon_i = -1$ in the case $G_i = Q_i^v$ mod n.

6. The computer-implemented process according to claim 2, wherein the challenges are such that $0 \leq d_i \leq 2^k - 1$ for i=1, . . . ,m.

7. A computer-implemented process according to claim 1 for allowing a signatory to sign a message M, further comprising:

selecting randomly m integers $r_i$ such that $0 < r_i < n$ for i=1, . . . ,m;

computing commitments $R_i$ having a value such that: $R_i = r_i^v$ mod n, for i=1, . . . ,m;

computing a token T having a value such that T=h(M, $R_1, R_2, \ldots, R_m$), wherein h is a function of (m+1) integers which makes use of a hash function and produces a binary train consisting of m bits;

identifying the bits $d_1, d_2, \ldots, d_m$ of the token T; and computing responses $D_i = r_i \times Q_i^{d_i}$ mod n for i=1, . . . ,m.

8. The computer-implemented process according to claim 7, further comprising:

collecting the token T and the responses $D_i$ for i=1, . . . ,m; and determining that the message M is authentic if the response D has a value such that: $h(M, D_1^v \times G_1^{\epsilon_1 d_1}$ mod n, $D_2^v \times G_2^{\epsilon_2 d_2}$ mod n, . . . , $D_m^v \times G_m^{\epsilon_m d_m}$ mod n) is equal to the token T, wherein, for i=1, . . . ,m, $\epsilon_i = +1$ in the case $G_i \times Q_i^v = 1$ mod n and $\epsilon_i = -1$ in the case $G_i = Q_i^v$ mod n.

9. A system comprising:

a memory storing a set of instructions; and a processor coupled to the memory for executing the set of instructions stored in the memory, the instructions including:

obtaining a set of one or more private values $Q_1, Q_2, \ldots, Q_m$ and respective public values $G_1, G_2, \ldots, G_m$, each pair of keys $(Q_i, G_i)$ verifying either the equation $G_i \cdot Q_i^v \equiv 1$ mod n or the equation $G_i \equiv Q_i^v$ mod n, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v=2^k$, wherein k is a security parameter having an integer value greater than 1, and wherein each public value $G_i$ (for $i=1, \ldots, m$) is such that $G_i \equiv g_i^2$ mod n, wherein $g_i$ (for $i=1, \ldots, m$) is a base number having an integer value greater than 1 and smaller than each of the prime factors $p_1, \ldots, p_f$, and wherein, for at least one integer value l between 1 and m, $g_l$ or $(-g_1)$ is a quadratic residue of the body of integers modulo n, and wherein, for at least one integer value s between 1 and m, $q_s$ is neither congruent to $g_s$ mod n nor congruent to $(-g_s)$ mod n, wherein, for $i=1, \ldots, m$, $q_i \equiv Q_i^{-v/2}$ mod n in the case $G_i \times Q_i^v = 1$ mod n and $q_i = Q_i^{v/2}$ mod n in the case $G_i = Q_i^v$ mod n; and using at least the private values $Q_1, Q_2, \ldots, Q_m$ in an authentication or in a signature method.

10. A computer-readable storage medium storing instructions which when executed cause a processor to execute the following acts:

obtaining a set of one or more private values $Q_1, Q_2, \ldots, Q_m$ and respective public values $G_1, G_2, \ldots, G_m$, each pair of keys $(Q_i, G_i)$ verifying either the equation $G_i \cdot Q_i^v \equiv 1$ mod n or the equation $G_i \equiv Q_i^v$ mod n, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v=2^k$, wherein k is a security parameter having an integer value greater than 1, and wherein each public value $G_i$ (for $i=1, \ldots, m$) is such that $G_i \equiv g_i^2$ mod n, wherein $g_i$ (for $i=1, \ldots, m$) is a base number having an integer value greater than 1 and smaller than each of the prime factors $p_1, \ldots, p_f$, and wherein, for at least one integer value l between 1 and m, $g_l$ or $(-g_l)$ is a quadratic residue of the body of integers modulo n, and wherein, for at least one integer value s between 1 and m, $q_s$ is neither congruent to $g_s$ mod n nor congruent to $(-g_s)$ mod n, wherein, for $i=1, \ldots, m$, $q_i \equiv Q_i^{-v/2}$ mod n in the case $G_i \times Q_i^v = 1$ mod n and $q_i = Q_i^{v/2}$ mod n in the case $G_i = Q_i^v$ mod n; and using at least the private values $Q_1, Q_2, \ldots, Q_m$ in an authentication or in a signature method.

11. A computer-implemented process for producing asymmetric cryptographic keys, said keys comprising $m \geq 1$ private values $Q_1, Q_2, \ldots, Q_m$ and m respective public values $G_1, G_2, \ldots, G_m$, the computer-implemented process comprising:

selecting a security parameter k, wherein k is an integer greater than 1;

determining a modulus n, wherein n is a public integer equal to the product of at least two prime factors $p_1, \ldots, p_f$;

selecting m base numbers $g_1, g_2, \ldots, g_m$, wherein each base number $g_i$ (for $i=1, \ldots, m$) has an integer value greater than 1 and smaller than each of the prime factors $p_1, \ldots, p_f$, and wherein, for at least one integer value l between 1 and m, $g_l$ or $(-g_l)$ is a quadratic residue of the body of integers modulo n;

calculating the public values $G_i$ for $i=1, \ldots, m$ through $G_i \equiv g_i^2$ mod n; and calculating the private values $Q_i$ for $i=1, \ldots, m$ by solving either the equation $G_i \cdot Q_i^v \equiv 1$ mod n or the equation $G_i \equiv Q_i^v$ mod n, wherein the public exponent v is such that $v=2^k$, such that, for at least one integer value s between 1 and m, $q_s$ is neither congruent to $g_s$ mod n nor congruent to $(-g_s)$ mod n, wherein, for $i=1, \ldots, m$, $q_i \equiv Q_i^{-v/2}$ mod n in the case $G_i \times Q_i^v = 1$ mod n and $q_i = Q_i^{v/2}$ mod n in the case $G_i = Q_i^v$ mod n.

* * * * *